US012068656B2

(12) United States Patent
Lu et al.

(10) Patent No.: US 12,068,656 B2
(45) Date of Patent: Aug. 20, 2024

(54) STATOR MODULES AND ROBOTIC SYSTEMS

(71) Applicant: PLANAR MOTOR INCORPORATED, Vancouver (CA)

(72) Inventors: Xiaodong Lu, Vancouver (CA); Graham Williamson, Vancouver (CA)

(73) Assignee: PLANAR MOTOR INCORPORATED (CA)

( * ) Notice: Subject to any disclaimer, the term of this patent is extended or adjusted under 35 U.S.C. 154(b) by 239 days.

(21) Appl. No.: 17/785,831

(22) PCT Filed: Dec. 16, 2020

(86) PCT No.: PCT/CA2020/051735
§ 371 (c)(1),
(2) Date: Jun. 15, 2022

(87) PCT Pub. No.: WO2021/119819
PCT Pub. Date: Jun. 24, 2021

(65) Prior Publication Data
US 2023/0054398 A1 Feb. 23, 2023

Related U.S. Application Data

(60) Provisional application No. 62/948,335, filed on Dec. 16, 2019, provisional application No. 63/081,584, filed on Sep. 22, 2020.

(51) Int. Cl.
*H02K 41/03* (2006.01)
*H02K 1/12* (2006.01)

(52) U.S. Cl.
CPC ............ *H02K 41/031* (2013.01); *H02K 1/12* (2013.01); *H02K 2201/18* (2013.01)

(58) Field of Classification Search
CPC ...... G09F 13/22; H02K 1/12; H02K 2201/18; H02K 2213/12; H02K 41/031
See application file for complete search history.

(56) References Cited

U.S. PATENT DOCUMENTS 3,376,578 A 4/1968 Sawyer
4,535,278 A 8/1985 Asakawa
(Continued)

FOREIGN PATENT DOCUMENTS

DE 102017131304 A1 6/2019
EP 3320606 A1 5/2018
(Continued)

OTHER PUBLICATIONS

Extended European Search Report Issued in EP App. No. 20900930.7, dated Dec. 20, 2023 (13 pages).
(Continued)

*Primary Examiner* — Naishadh N Desai
(74) *Attorney, Agent, or Firm* — Ewing & Jones, PLLC

(57) ABSTRACT

Stator modules are disclosed. Stator modules may include: a stator body; a working surface supported relative to the stator body; and a plurality of electrical conductors, each electrical conductor of the plurality of electrical conductors extending along a respective portion of the working surface and operable to generate a magnetic field to facilitate moving, relative to the working surface, a magnetized mover in the magnetic field in response to electrical current through the electrical conductor. Robotic systems including such stator modules are also disclosed.

21 Claims, 15 Drawing Sheets

(56) References Cited

U.S. PATENT DOCUMENTS

| | | | |
|---|---|---|---|
| 4,654,571 | A | 3/1987 | Hinds |
| 5,196,745 | A | 3/1993 | Trumper |
| 5,334,892 | A | 8/1994 | Chitayat |
| 6,003,230 | A | 12/1999 | Trumper et al. |
| 6,005,309 | A | 12/1999 | Chitayat |
| 6,069,418 | A | 5/2000 | Tanaka |
| 6,097,114 | A | 8/2000 | Hazelton |
| 6,208,045 | B1 | 3/2001 | Hazelton et al. |
| 6,252,234 | B1 | 6/2001 | Hazelton et al. |
| 6,304,320 | B1 | 10/2001 | Tanaka et al. |
| 6,339,266 | B1 | 1/2002 | Tanaka |
| 6,441,514 | B1 | 8/2002 | Markle |
| 6,445,093 | B1 * | 9/2002 | Binnard .............. G03F 7/70716 310/12.25 |
| 6,452,292 | B1 * | 9/2002 | Binnard .............. G03F 7/70758 414/935 |
| 6,495,934 | B1 | 12/2002 | Hayashi et al. |
| 6,720,680 | B1 | 4/2004 | Tanaka |
| 6,777,896 | B2 | 8/2004 | Teng |
| 6,835,941 | B1 | 12/2004 | Tanaka |
| 6,847,134 | B2 | 1/2005 | Frissen et al. |
| 6,885,430 | B2 | 4/2005 | Tanaka et al. |
| 6,987,335 | B2 | 1/2006 | Korenaga |
| 7,075,198 | B2 | 7/2006 | Korenaga |
| 7,224,252 | B2 | 5/2007 | Meadow, Jr. et al. |
| 7,227,284 | B2 | 6/2007 | Korenaga |
| 7,436,135 | B2 | 10/2008 | Miyakawa |
| 7,696,653 | B2 | 4/2010 | Tanaka |
| 7,808,133 | B1 | 10/2010 | Widdowson et al. |
| 7,948,122 | B2 | 5/2011 | Compter et al. |
| 8,031,328 | B2 | 10/2011 | Asano et al. |
| 10,116,195 | B2 | 10/2018 | Lu |
| 10,222,237 | B2 | 3/2019 | Lu |
| 2004/0140780 | A1 | 7/2004 | Cahill et al. |
| 2008/0203828 | A1 | 8/2008 | Compter et al. |
| 2012/0328836 | A1 * | 12/2012 | Binnad ............... G03F 7/70758 355/72 |
| 2017/0179806 | A1 * | 6/2017 | Lu .......................... H02N 15/00 |
| 2020/0030995 | A1 * | 1/2020 | Lu ........................... H02K 7/14 |
| 2020/0304010 | A1 | 9/2020 | Brinkmann et al. |

FOREIGN PATENT DOCUMENTS

| | | |
|---|---|---|
| WO | 2013059934 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2018176137 A1 | 10/2018 |
| WO | WO-2018176137 A1 * | 10/2018 .......... B25J 15/0246 |

OTHER PUBLICATIONS

Buckley, J.D., Galbert, D.N., Karatzas, C., 1989, "Step-and-scan lithography using reduction optics", J. Vae. Sci. Technol., B 7 (6), Nov./Dec. 1989.

Cho, H.S., Im, C.H., Jung, H.K., 2001, "Magnetic Field Analysis of 2-D Permanent Magnet Array for Planar Motor", IEEE Transactions on Magnetics, 37/5:3762-3766.

Compter, Ir.J.C., 2004, "Electro-dynamic planar motor", Precision Engineering, 28/2:171-180.

Etxaniz, I., Izpizua, A., San Martin, M., Arana, J., 2006, "Magnetic Levitated 2D Fast Drive", IEEJ Transactions on Industry Applications, 126/12:1678-1681.

Flores Filho, A.F., Susin, A.A., Da Silveira, M.A., 1999, "Development of a novel planar actuator", Ninth International Conference on Electrical Machines and Drives, Conference Publication No. 468.

Flores Filho, A.F., Baggio Filho, N.F., 2010, "Analysis of a DC XY-Actuator", XIX International Conference on Electrical Machines—ICEM 2010, Rome.

Flores Filho, A.F., Susin, A.A, Da Silveira, M.A., 2001, "Investigation of the Forces Produced by a New Electromagnetic Planar Actuatuator", Electric Machines and Drives Conference, 2001, IEMDC 2001, IEEE International, pp. 8-13.

Fujii, N., Okinaga, K., 2002, "X-Y Linear Synchronous Motors Without Force Ripple and Core Loss for Precision Two-Dimensional Drives", IEEE Transactions on Magnetics, 38/5:3273-3275.

Gao, W., Dejima, S., Yanai, H., Katakura, K., Kiyono, S., Tomita, Y., 2004, "A surface motor-driven planar motion stage integrated with an XYθZ surface encoder for precision positioning", Precision Engineering, 28/3:329-337.

Hesse, S., Schaeffel, C., Katzschmann, M., Buechner, H.-J., 2011, "Interferometric Controlled Planar Nanopositioning System with 100 mm Circular Travel Range", ASPE 2011 Annual Meeting, Denver, Co.

Hollis, R., Salcudean, S.E., Allan, A.P., 1991, "A six-degree-of-freedom magnetically levitated variable compliance fine-motion wrist: Design, modeling, control", IEEE Transactions on Robotics and Automation, 7/3:320-332.

Holmes, M., Hocken, R., Trumper, D., 2000, "The Long-Range Scanning Stage: a Novel Platform for Scanned-Probe Microscopy", Precision Engineering, 24/3:191-209.

In, W., Lee S., Jeong, J.I., Kim, J., 2008, "Design of a planar-type high speed parallel mechanism positioning platform with the capability of 180 degrees orientation", CIRP Annals—Manufacturing Technology 57/1:421-424.

International Search Report issued in PCT/CA2020/051735, mailed Mar. 15, 2021 (3 pages).

Jansen, J.W., Van Lierop, C.M.M., Lomonova, E.A., Vandenput, A.J.A., 2008, "Magnetically Levitated Planar Actuator with Moving Magnets", IEEE Transactions on Industry Applications, 44/4:1108-1115.

Jansen, J.W., Van Lierop, C.M.M., Lomonova, E.A., Vandenput, A.J.A, 2007, "Modeling of magnetically levitated planar actuators with moving magnets", IEEE Transactions on Magnetics, 43/1:15-25.

Kajiyama, H., Suzuki, K., Dohmeki, H., 2010, "Development of ironless type surface motor", XIX International Conference on Electrical Machines—ICEM 2010, Rome.

Kim, W., Trumper, D.L., 1998, "High-precision magnetic levitation stage for photolithography", Precision Engineering, 22/2:66-77.

Lee, K.-M., Roth, R.B., Zhou, Z., 1996, "Dynamic Modeling and Control of a Ball-Joint-Like Variable-Reluctance Spherical Motor", Journal of Dynamic Systems, Measurement, and Control, 118/1:29-40.

Shinno, H., Yoshioka, H., Taniguchi, K., 2007, "A Newly Developed Linear Motor-Driven Aerostatic X-Y Planar Motion Table System for Nano-Machining", Annals of the CIRP, 56/1:369-372.

Tomita, Y., Koyanagawa, Y., 1995, "Study on a surface-motor driven precise positioning system", Journal of Dynamic Systems, Measurement, and Control, 117:311-319.

Trumper, D.L., Williams, M.E., Nguyen, T.H., 1993, "Magnet arrays for synchronous machines", IEEE Industry Applications Society Annual Meeting, 1:9-18.

Ueda, Y., Ohsaki, H., 2008, "A planar actuator with a small mover traveling over large yaw and translational displacements", IEEE Transactions on Magnetics, 44/5:609-616.

Verma, S., Kim, W.-J, Gu, J., 2004, "Six-axis nanopositioning device with precision magnetic levitation technology", IEEE Transactions on Mechatronics, 9/2:384-391.

Weck, E.h.M., Reinartz, T., Henneberger, G., De Doncker, R.W., 2000, "Design of a Spherical Motor with Three Degrees of Freedom", Annals of the CIRP, 49/1:289-294.

Written Opinion of the International Searching Authority issued in PCT/CA2020/051735, mailed Mar. 15, 2021 (3 pages).

"Multi-Carrier-System MCS®—The innovative transport system from Festo and Siemens", available from https://www.youtube.com/watch?v=HY3q2xGxxCo and dated Dec. 10, 2019.

"Multi-Carrier-System for more flexibility", available from https://www.youtube.com/watch?v=zrEkKAv95F8 and dated Mar. 24, 2015.

* cited by examiner

STATOR MODULES AND ROBOTIC SYSTEMS

CROSS-REFERENCE TO RELATED APPLICATIONS

This application claims the benefit of, PCT/CA2020/051735 filed Dec. 16, 2020, which itself claims the benefit of, and priority to, United States provisional patent application no. 62/948,335 filed on Dec. 16, 2019 and United States provisional patent application no. 63/081,584 filed on Sep. 22, 2020, the entire contents of which are incorporated by reference herein.

FIELD

This disclosure relates generally to stator modules and robotic systems.

RELATED ART

Robotic systems are known. However, known robotic systems may have some disadvantages.

SUMMARY

According to one embodiment, there is disclosed a stator module comprising: a stator body; a working surface supported relative to the stator body and extending by a width in a first dimension between first and second exposed opposite sides of the stator module, the working surface further extending by a length in a second dimension between first and second opposite ends of the stator module, the second dimension different from the first dimension, the length greater than the width; and a plurality of electrical conductors, each electrical conductor of the plurality of electrical conductors extending along a respective portion of the working surface and operable to generate a magnetic field to facilitate moving, relative to the working surface, a magnetized mover in the magnetic field in response to electrical current through the electrical conductor; at least some electrical conductors of the plurality of electrical conductors in a first layer of electrical conductors of the plurality of electrical conductors extending in a first electrical conductor direction; and at least some electrical conductors of the plurality of electrical conductors in a second layer of electrical conductors of the plurality of electrical conductors separate from the first layer of electrical conductors extending in a second electrical conductor direction nonparallel to the first electrical conductor direction; the at least some electrical conductors of the plurality of electrical conductors in the first layer at least partially overlapping the at least some electrical conductors of the plurality of electrical conductors in the second layer in a direction orthogonal to the first and second electrical conductor directions; wherein the plurality of electrical conductors and the working surface are supported relative to the stator body such that the stator module is a unitary assembly.

According to another embodiment, there is disclosed a stator module comprising: a stator body; a working surface supported relative to the stator body; and a plurality of electrical conductors, each electrical conductor of the plurality of electrical conductors extending along a respective portion of the working surface and operable to generate a magnetic field to facilitate moving, relative to the working surface, a magnetized mover in the magnetic field in response to electrical current through the electrical conductor; at least some electrical conductors of the plurality of electrical conductors in a first layer of electrical conductors of the plurality of electrical conductors extending in a first electrical conductor direction; at least some electrical conductors of the plurality of electrical conductors in the first layer of electrical conductors of the plurality of electrical conductors extending in a second electrical conductor direction nonparallel to the first electrical conductor direction; and at least some electrical conductors of the plurality of electrical conductors in a second layer of electrical conductors of the plurality of electrical conductors separate from the first layer of electrical conductors extending in a third electrical conductor direction nonparallel to the first electrical conductor direction and nonparallel to the second electrical conductor direction.

According to another embodiment, there is disclosed a stator module comprising: a stator body; a working surface supported relative to the stator body; a motor sub-module comprising a plurality of electrical conductors, each electrical conductor of the plurality of electrical conductors extending along a respective portion of the working surface and operable to generate a magnetic field to facilitate moving, relative to the working surface, a magnetized mover in the magnetic field in response to electrical current through the electrical conductor; and a position-sensor sub-module comprising at least one position sensor operable to sense a position of the mover and defining a plurality of through-holes; wherein the stator body comprises a surface and a plurality of protrusions, each protrusion of the plurality of protrusions extending from the surface, towards the motor sub-module, and through a respective through-hole of the plurality of through-holes of the position-sensor sub-module and supporting the motor sub-module.

Other aspects and features will become apparent to those ordinarily skilled in the art upon review of the following description of illustrative embodiments in conjunction with the accompanying figures.

DETAILED DESCRIPTION

The following references may assist the reader: U.S. Pat. Nos. 6,003,230; 6,097,114; 6,208,045; 6,441,514; 6,847,134; 6,987,335; 7,436,135; 7,948,122; United States patent publication no. 2008/0203828; W. J. Kim and D. L. Trumper, "High-precision magnetic levitation stage for photolithography", Precision Eng. 22 2 (1998), pp. 66-77; D. L. Trumper et al., "Magnet arrays for synchronous machines", IEEE Industry Applications Society Annual Meeting, vol. 1, pp. 9-18, 1993; J. W. Jansen, C. M. M. van Lierop, E. A. Lomonova, A. J. A. Vandenput, "Magnetically Levitated Planar Actuator with Moving Magnets", IEEE Tran. Ind. App., Vol 44, No 4, 2008; PCT publication no. WO 2013/059934; PCT publication no. WO 2015/017933; PCT publication no. WO 2015/188281; PCT publication no. WO 2015/184553; and PCT publication no. WO 2015/179962.

Figure 1:
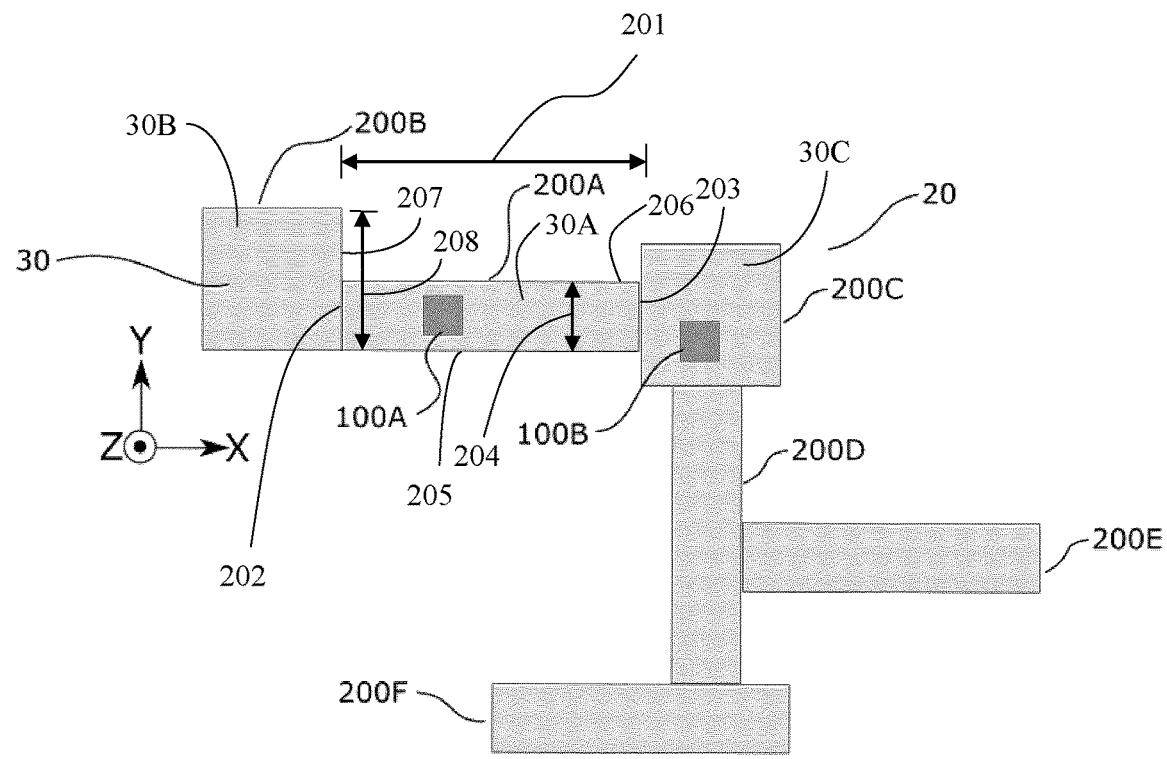
FIG. 1 is a top view of a robotic system according to one embodiment.
Figure 2:
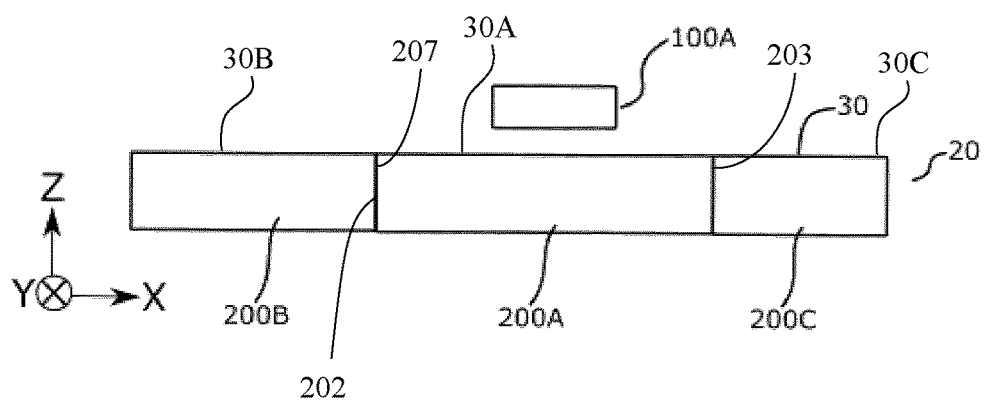
FIG. 2 is a cross-sectional view of the robotic system of FIG. 1.

Referring to FIG. 1 and to FIG. 2, robotic system according to one embodiment includes a stator 20 and movers 100A and 100B. The stator 20 includes stator modules 200A, 200B, 200C, 200D, 200E, and 200F. The stator modules 200A, 200B, 200C, 200D, 200E, and 200F collectively define a working surface 30 of the stator 20, and the movers 100A and 100B may move relative to the working surface 30 as described herein, for example. Of course the embodiment shown is an example only, and alternative embodiments may differ. For example, alternative embodiments may include more, fewer, or different stator modules, and alternative embodiments may include more, fewer, or different movers. For example, some embodiments may include only one stator module or more than one stator module. Further, the working surface 30 is planar, but alternative working surfaces may be curved, cylindrical, spherical, or other shapes, for example.

In the embodiment shown, the robotic system may be described with reference to various axes. For example, in the embodiment shown, the stator 20 may be described with reference to Cartesian axes identified as X, Y, and Z in the drawings, and the Cartesian axes identified as X, Y, and Z may be fixed relative to the stator 20 such that the X and Y axes are perpendicular to each other, such that the working surface 30 extends in the X and Y axes, and such that the Z axis is perpendicular to the working surface 30 and to the X and Y axes. However, alternative embodiments may differ, and embodiments such as those described herein are not limited to or limited by any particular axes.

As shown in FIG. 1 for example, embodiments such as those described herein may include stators including differently shaped stator modules. As also shown in FIG. 1 for example, embodiments such as those described herein may include stators including stator modules having working surfaces that form respective portions of at least some of an overall working surface of a stator, and the respective working surfaces of the stator modules may have different shapes.

For example, in the embodiment of FIG. 1, each of the stator modules 200A, 200B, 200C, 200D, 200E, and 200F has a respective working surface, and as examples, FIG. 1 illustrates a working surface 30A of the stator module 200A, a working surface 30B of the stator module 200B, and a working surface 30C of the stator module 200C. In the embodiment of FIG. 1, the respective working surfaces of the stator modules 200A, 200B, 200C, 200D, 200E, and 200F form respective portions of at least some of the working surface 30, and the respective working surfaces of the stator modules 200A, 200B, 200C, 200D, 200E, and 200F have different shapes. For example, in the embodiment shown, the working surfaces 30B and 30C of the stator modules 200B and 200C are square-shaped and the respective working surfaces of the stator modules 200A, 200D, 200E, and 200F are rectangular, but of course alternative embodiments may differ.

In other words, in the embodiment shown, for example, the stator module 200A and the working surface 30A of the stator module 200A have a length 201 in a dimension (along the X axis in this embodiment) between opposite ends 202 and 203 of the stator module 200A and of the working surface 30A of the stator module 200A, the stator module 200A and the working surface 30A of the stator module 200A have a width 204 in a different dimension (along the Y axis in this embodiment) between exposed opposite sides 205 and 206 of the stator module 200A and of the working surface 30A of the stator module 200A, and the length 201 is greater than the width 204. The sides 205 and 206 may be referred to as "exposed" because the sides 205 and 206 are exposed to an environment of the stator 30 without other structure of the stator 30 or without any other structure on the sides 205 and 206.

As shown in FIG. 1 for example, a stator module having one shape (or having a working surface having one shape) may be positioned against, adjacent, or abutting a stator module having a different shape (or having a working surface having a different shape), and a stator module having one orientation (or having a working surface having one orientation) may be positioned against, adjacent, or abutting a stator module having a different orientation (or having a working surface having a different orientation).

For example, in the embodiment of FIG. 1, the stator module 200A is rectangular, the working surface 30A of the stator module 200A is rectangular, and the stator module 200A is positioned against, adjacent, or abutting a side 207 of the stator module 200B with the respective working surfaces of the stator modules 200A and 200B adjacent or abutting each other, and the stator module 200B and the working surface of the stator module 200B are square-shaped. The side 207 has a width (or, more generally, an extent) 208 greater than the width 204.

Also, in the embodiment of FIG. 1, the stator module 200D is positioned against, adjacent, or abutting the stator module 200E with the respective working surfaces of the stator modules 200D and 200E adjacent or abutting each other, the stator modules 200D and 200E are rectangular, and the respective working surfaces of the stator modules 200D and 200E are rectangular, but the stator module 200D and the working surface of the stator modules 200D extend along the Y axis and the stator module 200E and the working surface of the stator modules 200E extend along the X axis. In other words, in the embodiment shown, the stator module 200D and the working surface of the stator modules 200D have one orientation (along the Y axis) and may be positioned against, adjacent, or abutting another stator module (the stator module 200E in the embodiment shown), and the other stator module and the working surface of the other stator module have a different orientation (along the X axis). Of course alternative embodiments may differ.

In general, such combinations of stator modules having such different shapes may allow for greater flexibility for designing or assembling different stators for different applications when compared to stator modules having the same shapes (such as only square shapes, for example). Further, such combinations of stator modules having such different shapes may allow for stators to be assembled at lower costs when compared to stators that are assembled from stator modules having the same shapes (such as only square shapes, for example) because, for example, rectangular stator modules such as the stator modules 200A, 200D, 200E, and 200F may extend a longer distance for a lower cost than square-shaped stator modules, for example.

Figure 3:
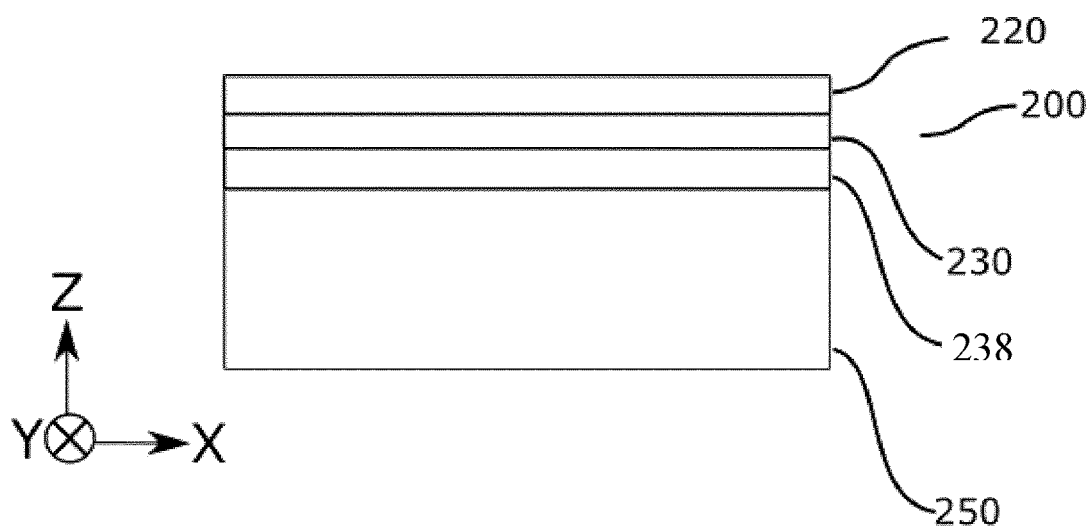
FIG. 3 schematically illustrates a stator module according to one embodiment.

FIG. 3 schematically illustrates a stator module 200, which may be illustrative of the stator modules 200A, 200D, 200E, and 200F or of other stator modules such as those described herein, for example. The stator module 200 includes a motor sub-module 220, a position-sensor sub-module 230, an amplifier sub-module 238, and a stator body 250 as mechanical structure supporting the sub-modules and the working surfaces. The motor sub-module 220 may include electrical conductors that may be operable to generate a magnetic field to facilitate moving, relative to a working surface of the stator module 200, a magnetized mover (such as the mover 100A or 100B) in the magnetic field along (or otherwise relative to) the working surface in response to electrical currents through the electrical conductors. The position-sensor sub-module 230 may include at least one position sensor operable to sense a position of such a mover. The amplifier sub-module 238 may be operable to amplify control signals received from a system controller or a module controller to control at least some of the electrical conductors of the motor sub-module 220. In some embodiments, the amplifier sub-module 238 may be operable to amplify control signals received from a system controller or a module controller to control each electrical conductor of the motor sub-module 220.

In this particular non-limiting embodiment, the order of components from top to bottom is motor sub-module 220, then the position-sensor sub-module 230, followed by the amplifier sub-module 238. That particular arrangement from top to bottom is not required, and alternative embodiments may differ. However, in some embodiments, the motor sub-module should be as close to the working surface as possible to maximize the generated magnetic field experienced by a mover (such as the mover 100A or 100B) above the working surface. In alternative embodiments, the arrangement of sub-modules may differ, or alternative embodiments may include more, fewer, or different sub-modules.

Figure 4:
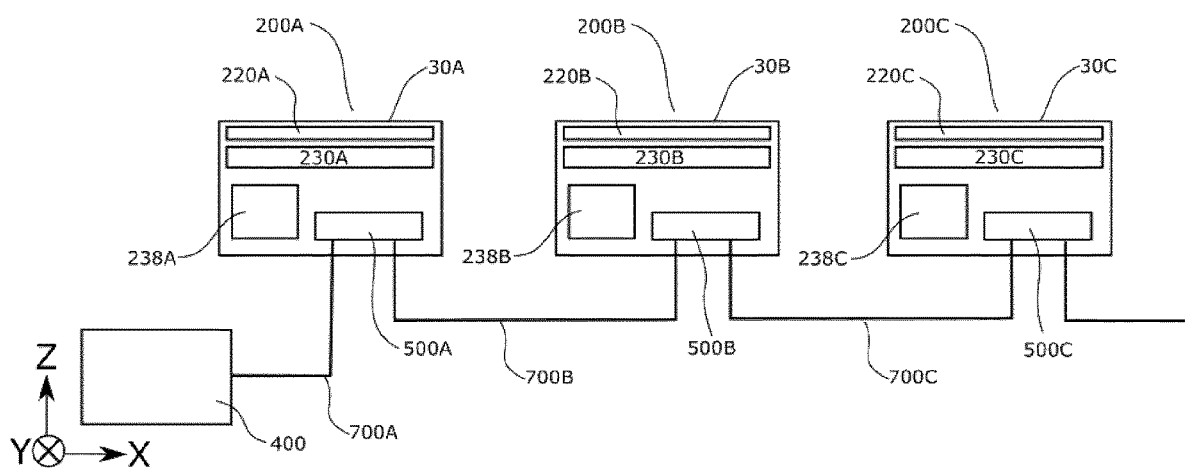
FIG. 4 schematically illustrates stator modules and a control system according to one embodiment.

FIG. 4 schematically illustrates the stator modules 200A, 200B, and 200C and a control system (or a system controller or a control circuit) 400 operable to control the stator modules 200A, 200B, and 200C (and possibly more or fewer stator modules). The stator module 200A includes a motor sub-module 220A, a position-sensor sub-module 230A, an amplifier sub-module 238A, and a module controller 500A. The stator module 200B includes a motor sub-module 220B, a position-sensor sub-module 230B, an amplifier sub-module 238B, and a module controller 500B. The stator module 200C includes a motor sub-module 220C, a position-sensor sub-module 230C, an amplifier sub-module 238C, and module controller 500C. Each stator module may also include a stator body (such as the stator body 250 described above, for example) as mechanical structure supporting the sub-modules and the working surfaces of the stator module. The motor sub-modules 220A, 220B, and 220C may each include electrical conductors that may be operable to generate a magnetic field to facilitate moving, relative to a working surface of the stator module 200, a magnetized mover (such as the mover 100A or 100B) in the magnetic field along (or otherwise relative to) the working surface in response to electrical currents through the electrical conductors. The position-sensor sub-modules 230A, 230B, and 230C may each include at least one position sensor operable to sense a position of such a mover. The amplifier sub-module 238A may include circuitry operable to amplify control signals received from the module controller 500A to control the electrical conductors of the motor sub-modules 220A, the amplifier sub-module 238B may include circuitry operable to amplify control signals received from the module controller 500B to control the electrical conductors of the motor sub-modules 220B, and the amplifier sub-module 238C may include circuitry operable to amplify control signals received from the module controller 500C to control the electrical conductors of the motor sub-modules 220C.

In the embodiment of FIG. 4, the control system 400 communicates with the module controller 500A using a data cable 700A, the module controller 500A communicates with the module controller 500B using a data cable 700B, and the module controller 500B communicates with the module controller 500C using a data cable 700C. Such communication may involve transmitting or receiving one or more signals to control the amplifier sub-module of the stator modules or transmitting or receiving one or more signals representing measurements by the position-sensor sub-modules of the stator modules, for example. In some embodiments, the control system 400 may transmit one or more control signals representing one or more set points (or desired values) of electrical currents flowing through some of the electrical conductors as described above, and such electrical current set points may transmitted to one or more module controllers (such as the module controllers 500A, 500B, and 500C), which may further generate one or more signals to one or more amplifier sub-modules (such as the amplifier sub-modules 238A, 238B, and 238C) so that the amplifier sub-modules may cause electrical currents to flow through electrical conductors as described above according to the electrical current set points. In some embodiments, the control system 400 may transmit one or more control signals representing one or more set points (or desired values) of mover positions to one or more module controllers (such as the module controllers 500A, 500B, and 500C), which may further use the position set points and position sensor information to determine electrical current set points for electrical currents flowing through some of the electrical conductors as described above. For example, to control an amplifier sub-module (such as the amplifier sub-module 238A, 238B, or 238C), a module controller (such as the module controller 500A, 500B, and 500C) may transmit, to the amplifier sub-module, one or more control signals (such as one or more pulse-width modulation (PWM) or analog control signals, for example) according to the electrical current set points. The data cables 700B and 700C are external to the stator modules 200A, 200B, and 200C, and in general, stator modules such as those described herein may communicate with each other using data cables external to the stator modules. Of course alternative embodiments may differ, and may include wireless communication or other alternatives to the embodiment of FIG. 4.

In general, the stator modules described above may be unitary. For example, stator bodies (such as the stator body 250) may support motor sub-modules, electrical conductors of the motor sub-modules, working surfaces, or other sub-modules such as those described herein, or two or more thereof such that the stator modules described above may be unitary assemblies. Such unitary assemblies may be connected to each other using external data cables (such as the data cables 700B and 700C external to the stator modules 200A, 200B, and 200C, for example) or other connections external to the stator modules. Further, stator modules as described herein may be units of a stator such that the stator may be formed from the stator modules such that the stator modules are the smallest units of the stator that include some or all of the sub-modules described above and that can function individually or collectively as stators.

Figure 5:
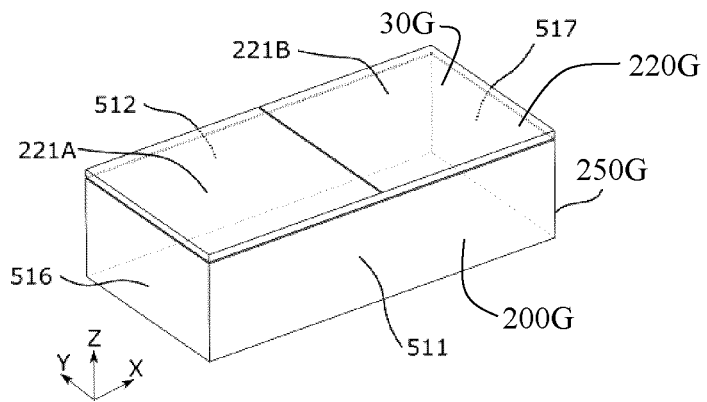
FIG. 5 and FIG. 6 illustrate a stator module according to one embodiment.
Figure 6:
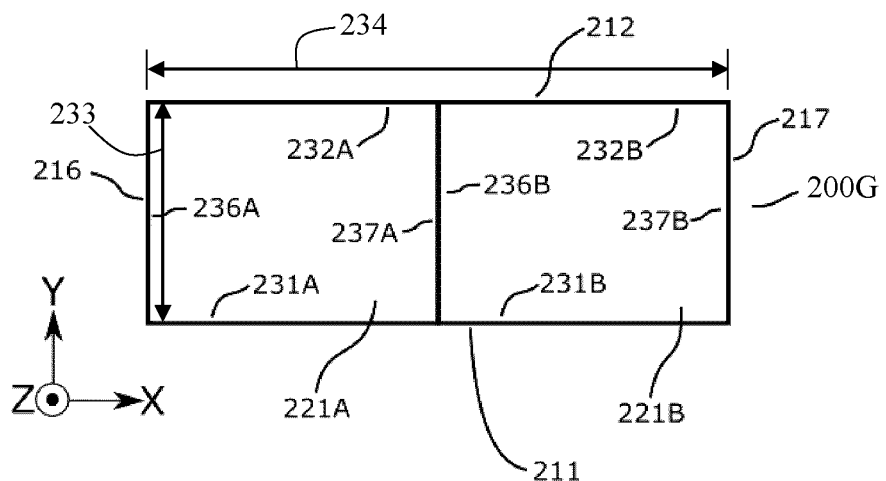
Figure 7:
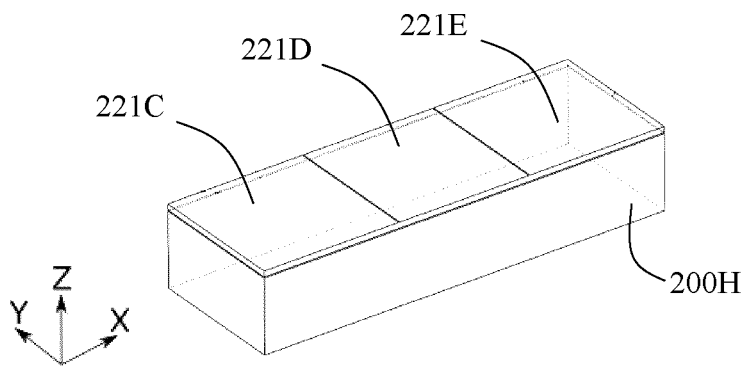
FIG. 7 illustrates a stator module according to another embodiment.
Figure 8:
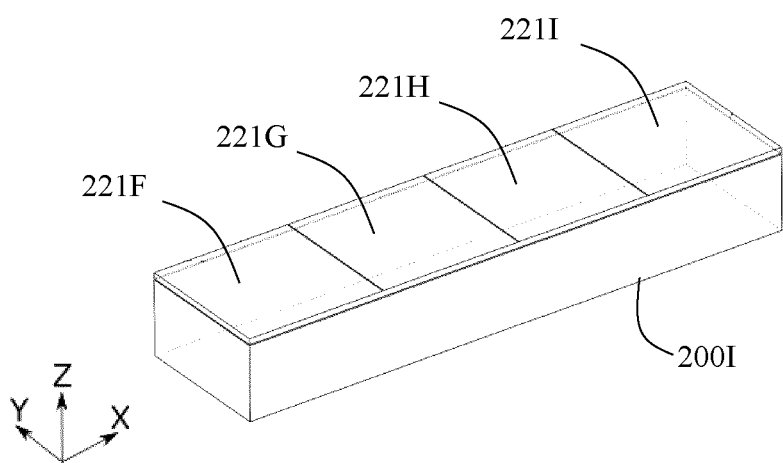
FIG. 8 illustrates a stator module according to another embodiment.

FIG. 5 and FIG. 6 illustrate a stator module 200G according to one embodiment. The stator module 200G includes a stator body 250G, a motor sub-module 220G, and a working surface 30G. The motor sub-module 220G includes two electromagnetic driving regions 221A and 221B in a single row and covered by the working surface 30G. Alternative embodiments may include only one electromagnetic driving region or more than two electromagnetic driving regions. For example, FIG. 7 illustrates a stator module 200H according to one embodiment and including three electromagnetic driving regions 221C, 221D, and 221E in a single row. As another example, FIG. 8 illustrates a stator module 200I according to one embodiment and including four electromagnetic driving regions 221F, 221G, 221H, and 221I in a single row. In such embodiments, Y-oriented edges (or, more generally, transverse edges) of the electromagnetic driving regions may be generally coincidental to such edges of one or more adjacent electromagnetic driving regions. The stator module 200H and 200I may otherwise be similar to the stator module 200G.

Referring back to FIG. 5 and FIG. 6, in the embodiment shown, the stator body 250G has outer side surfaces with a first outer side surface 511 (with a normal direction in −Y), a second outer side surface 516 (with a normal direction in −X), a third outer side surface 512 (with a normal direction in +Y), and a fourth outer side surface 517 (with a normal direction in +X). The projection of the surfaces 511, 512, 516, and 517 on the X-Y plane forms, respectively, a first projected surface edge 211, a second projected surface edge 216, a third projected surface edge 212, and a fourth projected surface edge 217.

In the embodiment shown, the first electromagnetic driving region 221A has a first edge 231A, a second edge 236A, a third edge 232A, and a fourth edge 237A. Although only four edges are shown, additional edges may be adopted in some embodiments. The second electromagnetic driving region 221B has a fifth edge 231B, a sixth edge 236B, a seventh edge 232B, and an eighth edge 237B. Again, although only four edges are shown, additional edges may be adopted in some embodiments. In this embodiment, the first projected surface edge 211 coincides with the first edge 231A, the third projected surface edge 212 coincides with the third edge 232A, the second projected surface edge 216 coincides with the second edge 236A, the fourth edge 237A coincides with the sixth edge 236B, the first projected surface edge 211 coincides with the fifth edge 231B, and the third projected surface edge 212 coincides with the seventh edge 232B.

Therefore, in the embodiment shown, the stator module 200G, the stator body 250G, and the working surface 30G have a width 233 between exposed opposite sides of the stator module 200G at the first projected surface edge 211 and at the third projected surface edge 212, and a length 234 between opposite ends of the stator module 200G at the second projected surface edge 216 and at the fourth projected surface edge 217. The length 234 is greater than the width 233, and the stator module 200G may therefore be included in a stator similarly to the stator module 200A as shown in FIG. 1, for example.

Figure 9:
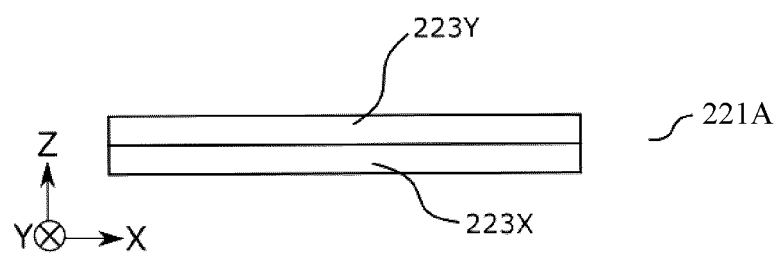
FIG. 9 illustrates an electromagnetic driving region of the stator module of FIG. 5 and FIG. 6.
Figure 10:
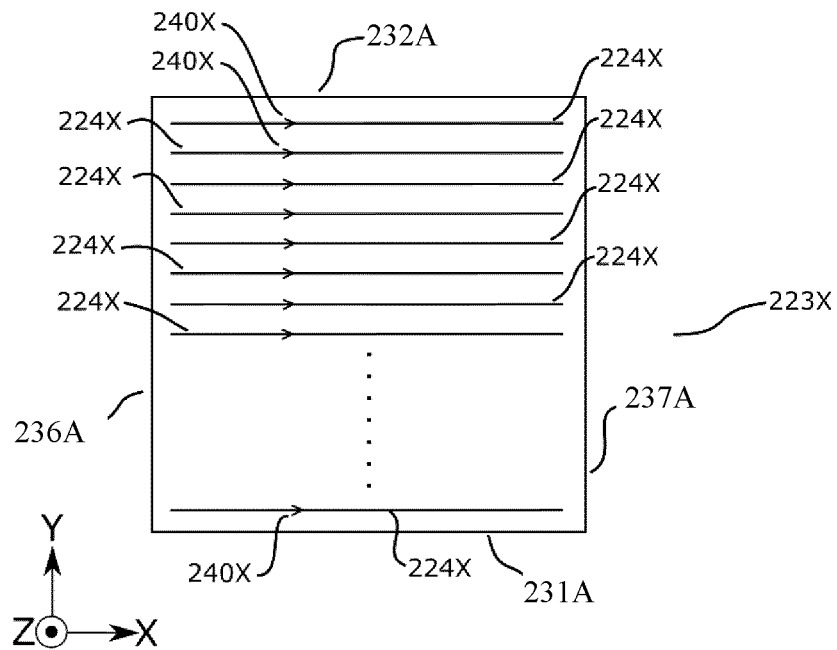
FIG. 10 illustrates electrical conductors in a first layer of the electromagnetic driving region of FIG. 9.
Figure 11:
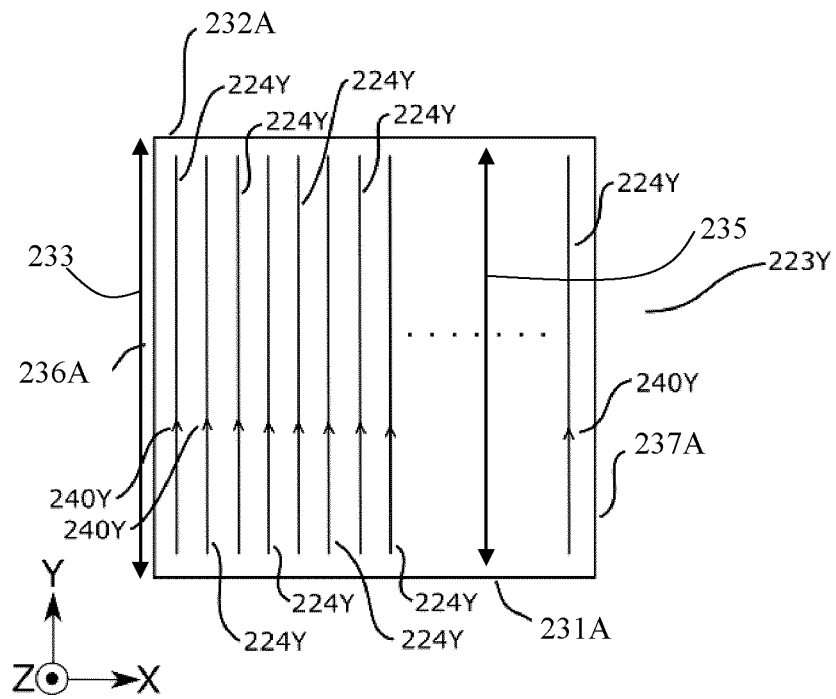
FIG. 11 illustrates electrical conductors in a second layer of the electromagnetic driving region of FIG. 9.

Referring to FIG. 9, FIG. 10, and FIG. 11, the electromagnetic driving region 221A (also shown in FIG. 5 and FIG. 6) includes electrical conductors 224X (which may be referred to a subset of the electrical conductors of the stator module 200G) in a first layer 223X of the electromagnetic driving region 221A. The electrical conductors 224X extend longitudinally relative to the working surface 30G, although alternative embodiments may include electrical conductors that extend in one or more different longitudinal directions, such as one or more curvilinear longitudinal directions or one or more directions that may not necessarily be along the X axis as shown. In general, a line, direction, or dimension as described herein may include a straight or curvilinear line, a linear or curved direction, or a linear or curved dimension.

In the embodiment shown, the electrical conductors 224X are evenly spaced apart from each other along the Y axis and extend between the edges 231A and 232A, but alternative embodiments may differ. Also, in the embodiment shown, a distance between the edge 231A and the electrical conductor 224X closest to the edge 231A is no more than five or ten times a width of the electrical conductor 224X, and a distance between the edge 232A and the electrical conductor 224X closest to the edge 232A is no more than five or ten times a width of the electrical conductor 224X, but alternative embodiments may differ. Each of the electrical conductors 224X also extends between the edges 236A and 237A, which may mean that a distance from the electrical conductors 224X to the edge 236A and a distance from the electrical conductors 224X to the edge 237A is no more than five or ten times a width of each electrical conductor 224X.

In general, herein, an electrical conductor may extend between two edges, meaning that a distance from the electrical conductor to each of the edges is no more than five or ten times a width of the electrical conductor.

Each of the electrical conductors 224X extends along a respective portion of the working surface 30G. When an electrical current passes through an electrical conductor 224X, a magnetic field around the electrical conductor 224X is generated. Therefore, each of the electrical conductors 224X may be operable to generate a magnetic field to facilitate moving, relative to the working surface 30G, a magnetized mover (such as the mover 100A or 100B) in the magnetic field along (or otherwise relative to) the working surface 30G in response to electrical currents 240X through the electrical conductors. Although the currents 240X are shown in the positive X direction, the actual current flowing direction can be either positive or negative, depending on the values of the current. The labeled current directions in this document are merely illustrative reference directions rather than restrictive or actual flowing directions.

The electromagnetic driving region 221A also includes electrical conductors 224Y (which may be referred to a subset of the electrical conductors of the stator module 200G) in a second layer 223Y of the electromagnetic driving region 221A separate from the first layer 223X in the Z direction (or, more generally, in a direction nonparallel or orthogonal to directions of the electrical conductors 224X and 224Y). The electrical conductors 224Y extend transversely relative to the working surface 30G, and may be orthogonal to the electrical conductors 224X, although alternative embodiments may include electrical conductors that extend in one or more different transverse directions, such as one or more curvilinear transverse directions or one or more directions that may not necessarily be along the Y axis as shown.

In the embodiment shown, the electrical conductors 224Y are evenly spaced apart from each other along the X axis and extend between the edges 236A and 237A, but alternative embodiments may differ. Also, in the embodiment shown, a distance between the edge 236A and the electrical conductor 224Y closest to the edge 236A is no more than five or ten times a width of the electrical conductor 224Y, and a distance between the edge 237A and the electrical conductor 224Y closest to the edge 237A is no more than five or ten times a width of the electrical conductor 224Y, but alternative embodiments may differ. Each of the electrical conductors 224Y also extends between the edges 231A and 232A, which may mean that a distance from the electrical conductors 224Y to the edge 231A and a distance from the electrical conductors 224Y to the edge 232A is no more than five or ten times a width of each electrical conductor 224Y.

Each of the electrical conductors 224Y extends along a respective portion of the working surface 30G. When an electrical current passes through an electrical conductor 224Y, a magnetic field around the electrical conductor 224Y is generated. Therefore, each of the electrical conductors 224Y may be operable to generate a magnetic field to facilitate moving, relative to the working surface 30G, a magnetized mover (such as the mover 100A or 100B) in the magnetic field along (or otherwise relative to) the working surface 30G in response to electrical currents 240Y through the electrical conductors.

Further, the electrical conductors 224Y extend entirely across a portion 235 of the width 233 of the working surface 30G, and all of the electrical conductors of the stator module 200G that extend transversely relative to the working surface 30G are within at least a portion of the portion 235 of the width 233 of the working surface 30G.

As shown in FIG. 9, the first layer 223X and the second layer 223Y at least partially overlap in the Z direction (or, more generally, in a direction nonparallel or orthogonal to directions of the electrical conductors 224X and 224Y). Further, although two layers are shown in FIG. 9, some embodiments may include only the first layer 223X or only the second layer 223Y, or some embodiments may include more than two layers. For example, some embodiments may include two or more layers similar to the first layer 223X, two or more layers similar to the second layer 223Y, or both. Of course other embodiments may include other alternatives.

Other electromagnetic driving regions, such as the electromagnetic driving regions 221B, 221C, 221D, 221E, 221F, 221G, 221H, and 221I for example, may be similar to the electromagnetic driving region 221A. Therefore, in the stator module 200G shown in FIG. 5 and FIG. 6, the electromagnetic driving region 221A includes longitudinal electrical conductors (such as the electrical conductors 224X, for example), and the electromagnetic driving region 221B also includes longitudinal electrical conductors (similar to the electrical conductors 224X, for example) but distinct from the longitudinal electrical conductors of the electromagnetic driving region 221A. In general, electromagnetic driving regions may include electrical conductors that may be distinct from some or all of the electrical conductors of some or all other electromagnetic driving regions of a stator module.

Figure 12:
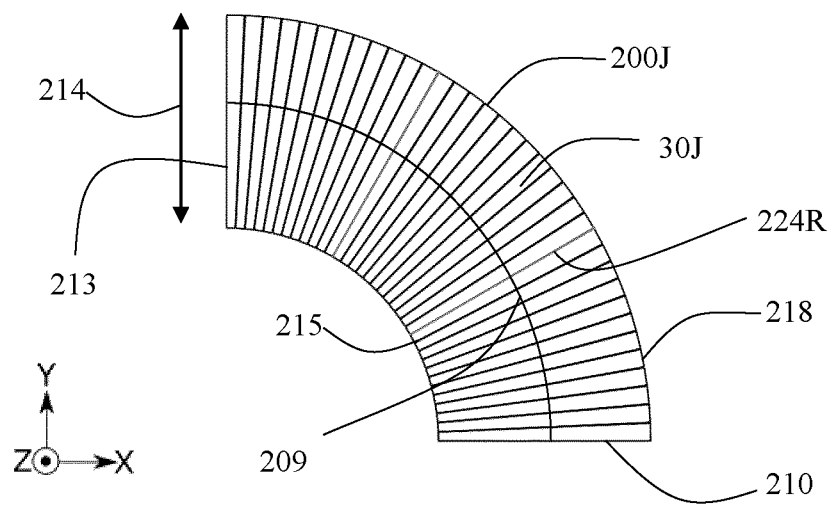
FIG. 12 illustrates a stator module according to another embodiment.
Figure 13:
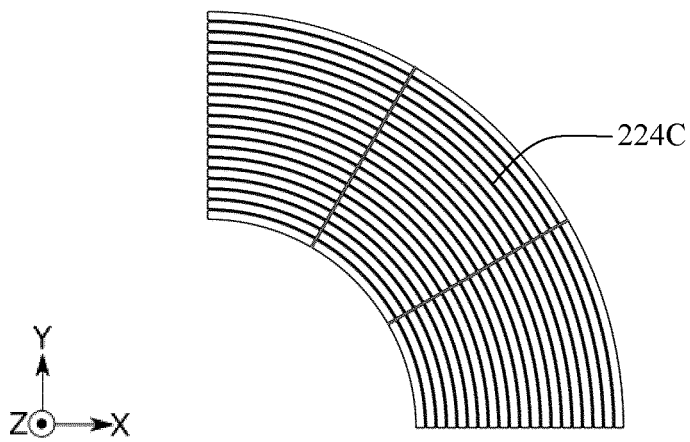
FIG. 13 illustrates additional electrical conductors of the stator module of FIG. 12 according to one embodiment.

The working surface 30G is substantially rectangular, but alternative embodiments may differ. For example, FIG. 12 illustrates a stator module 200J having a working surface 30J. The stator module 200J and the working surface 30J have a curved length 209 in a dimension (a curved dimension in this embodiment) between opposite ends 210 and 213 of the stator module 200J and of the working surface 30J, the stator module 200J and the working surface 30J have a width 214 in a different dimension (a radial dimension in this embodiment) between exposed opposite curved sides 215 and 218 of the stator module 200J and of the working surface 30J, and the length 209 is greater than the width 214. The stator module 200J includes radially extending electrical conductors 224R that may be similar to electrical conductors as described above, or the stator module 200J may include other electrical conductors that may be similar to electrical conductors as described above and that may at least partially overlap in the Z direction (or, more generally, in a direction nonparallel or orthogonal to directions of the electrical conductors). For example, in some embodiments, electrical conductors of the stator module 200J may be curved, and may be orthogonal to the radially extending electrical conductors 224R, such as curved electrical conductors 224C as shown in FIG. 13, for example.

In general, each electrical conductor may have different electrical current set point (or desired value) based on suitable commutation laws, such as but not being limited to three-phase sinusoidal commutation, for example. Multiple electrical conductors may be connected in serial at their ends, for example.

In general, the electrical currents through electrical conductors as described above may be determined to move a magnetized mover (such as the mover 100A or 100B) in one, two, three, four, five, or six degrees of freedom along a working surface of one stator module or along or relative to a working surface (such as the working surface 30 shown in FIG. 1 and FIG. 2) of a stator including more than one stator module. For example, the electrical currents through electrical conductors as described above may be determined to move a magnetized mover from the working surface of one stator module to the working surface of another stator module of such as stator.

Figure 14:
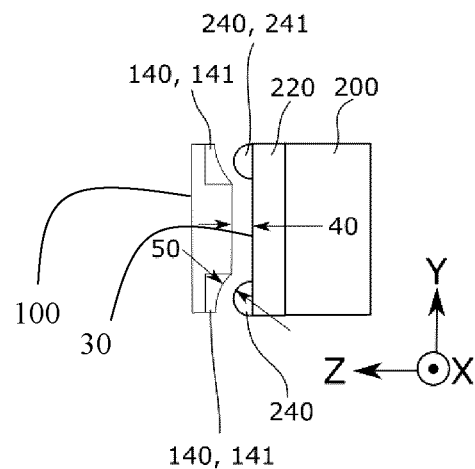
FIG. 14 illustrates a stator module and a mover according to another embodiment.

For example, FIG. 14 illustrates a mover 100 (with one or more bearing units 140 each having bearing surfaces 141) and a stator 200 (with one or more bearing units 240, which may be rails, each having bearing surfaces 241) according to one embodiment. During operation, the mover 100 may operate in a levitated state where the mover 100 is controlled by the stator 200 to maintain a sufficient working gap clearance 40 to ensure there is no contact between the mover bearing surfaces 141 and the stator bearing surfaces 241 such that the bearing support gap is a positive value. While operating in a levitated state, the Y direction motion of the mover may be limited in this particular embodiment by the stator bearing units 240, which may protrude above the stator work surface 30. During operation with this particular stator embodiment, the mover 100 may operate in a landed or engaged state in which the working gap 40 is decreased until the mover bearing surfaces 141 contact the stator bearing surfaces 241 (such that the bearing support gap 50 is generally zero). While operating in this state, motion of the mover 100 is constrained in five degrees of freedom, limiting motion of the mover 100 to be along the X direction. In such embodiments, electrical conductors of the stator 200 may all extend transversely (such as the electrical conductors 224Y, for example) relative to the stator work surface 30, although such electrical conductors may be shorter in length than the electrical conductors 224Y.

Figure 15:
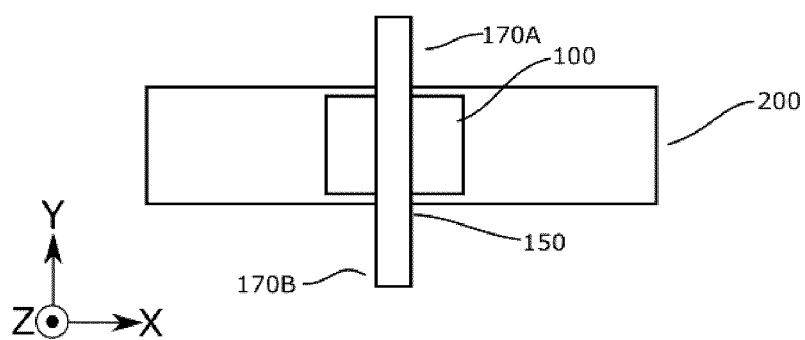
FIG. 15 illustrates a product on the mover of FIG. 14.

As indicated above, rectangular stator modules such as the stator modules 200A, 200D, 200E, 200F, and 200G may extend a longer distance for a lower cost than square-shaped stator modules, for example. Further, rectangular stator modules may more easily allow a product to extend wider than the stator modules. For example, FIG. 15 illustrates a product 150 is mounted on the mover 100 of FIG. 14 according to one embodiment. The product 150 has two ends 170A and 170B, which extend wider than the stator 100. In some embodiments, a high-force or energy-processing station (such as stamping, welding, or laser machining, for example) can be configured to process the product 150 on the two ends 170A and 170B of the product 150.

Figure 16:
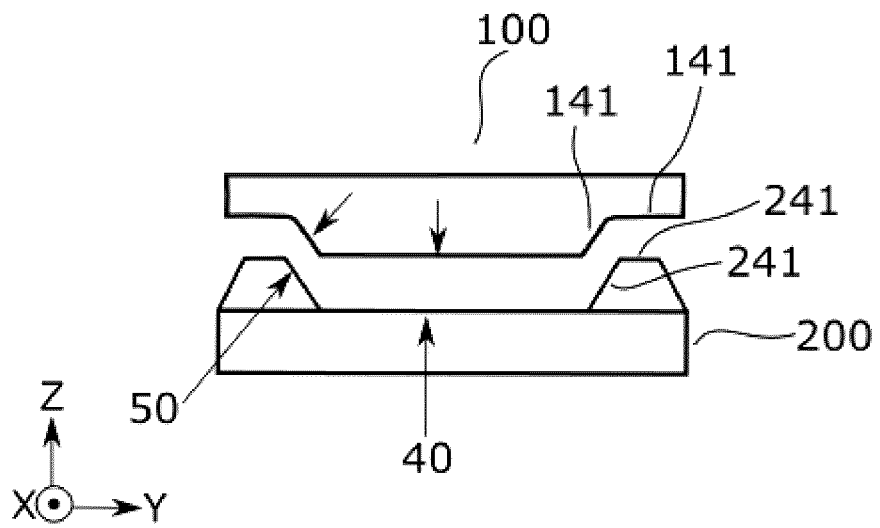
FIG. 16 illustrates a stator module and a mover according to another embodiment.

FIG. 16 illustrates an alternative to the mover 100 and stator 200 of FIG. 14. In general, the bearing surfaces 141 and 241 of the mover and stator bearing units 140 and 240 may be in the shape of curves, flat geometry, triangle, cylindrical, spherical, or some combination sufficient to guide mover motion and/or support the weight of the mover 100 (along the Z direction) while operating in a landed state. It may be desirable to maintain certain contact areas between the two mating bearing units to minimize wear during operation. The respective bearing units of the mover 100 and stator 200 may be matched together to achieve a desired behavior or performance. The bearings may utilize sliding or rolling contact during operation. In some embodiments, the two mating surfaces may not touch each other directly and a fluid film may exist in between, such as air or fluid during high speed motion.

Such aero-dynamic bearing may help significantly reduce wear on bearing surfaces without requiring much electrical energy as needed in magnetic levitation. The mating bearing units may be made of materials such as but not being limited to ceramics, glass, plastics, metals with surface properly processed, or other suitable materials with smooth surfaces.

Figure 17:
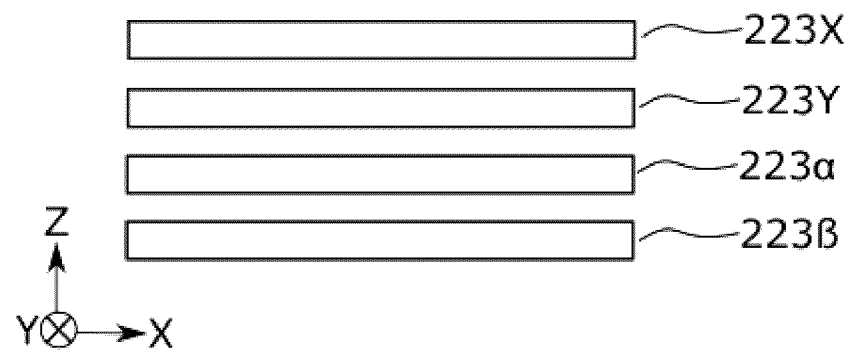
FIG. 17 illustrates a motor sub-module according to another embodiment.

FIG. 17 illustrates a motor sub-module according to another embodiment. The motor sub-module of FIG. 17 includes electrical conductors in a first layer 223X as described above and shown in FIG. 10, electrical conductors in a second layer 223Y (separate from the first layer 223X in the Z direction, or, more generally, in a direction nonparallel or orthogonal to directions of the electrical conductors in the first layer 223X and in the second first layer 223Y) as described above and shown in FIG. 11, electrical conductors in a third layer 223α (separate from the first and second layers 223X and 223Y in the Z direction, or, more generally, in a direction nonparallel or orthogonal to directions of the electrical conductors in the first layer 223X, in the second first layer 223Y, and in the third layer 223a), and electrical conductors in a third first layer 223β separate from the first, second, and third layers 223X, 223Y, and 223α. As shown in FIG. 17, the first, second, third, and fourth layers 223X, 223Y, 223α, and 223β at least partially overlap in the Z direction (or, more generally, in a direction nonparallel or orthogonal to directions of the electrical conductors of the first, second, third, and fourth layers 223X, 223Y, 223α, and 223β).

Figure 18:
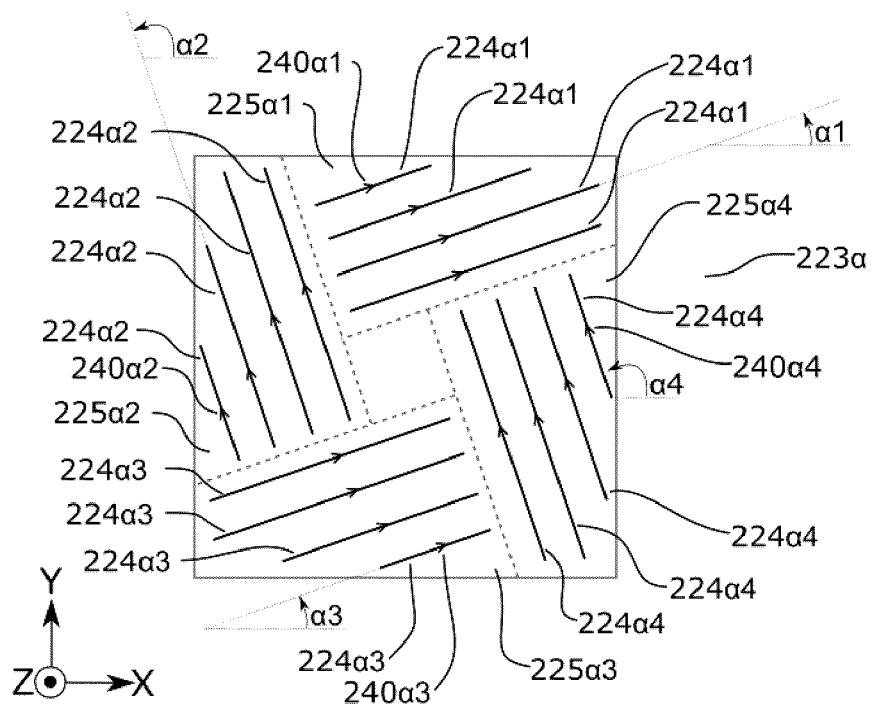
FIG. 18 illustrates electrical conductors in one layer of the motor sub-module of FIG. 17.

FIG. 18 illustrates electrical conductors 224α1 in a sub-sector 225α1, electrical conductors 224α2 in a sub-sector 225α2, electrical conductors 224α3 in a sub-sector 225α3, and electrical conductors 224α4 in a sub-sector 225α4 of the third layer 223α. The electrical conductors 224α1 extend at an angle α1 around the Z axis from the X axis, the electrical conductors 224α2 extend at an angle α2 around the Z axis from the X axis, the electrical conductors 224α3 extend at an angle α3 around the Z axis from the X axis, and the electrical conductors 224α4 extend at an angle α4 around the Z axis from the X axis. The electrical conductors in FIG. 18 are linear but may be curvilinear or include one or more curved segments in other embodiments. Further, although FIG. 18 illustrates four sub-sectors, alternative embodiments may include more or fewer sub-sectors, such as two or more sub-sectors, for example. In general, electrical conductors of one such sub-sector may be nonparallel to electrical conductors of another such sub-sector, and the electrical conductors of such sub-sectors may be in a common layer. Further, the electrical conductors of such sub-sectors may be nonparallel to the electrical conductors of another layer, such as the electrical conductors of the first layer 223X, of the second layer 223Y, or of both, for example. Electrical currents 240α1, 240α2, 240α3, 240α4 in the electrical conductors 224α1, 224α2, 224α3, 224α4 respectively may be controlled as described above, for example. In the embodiment shown, α2=α1+90°, α3=α1, α4=α2, and α1 is between 15° and 45°, for example 30°, although alternative embodiments may differ and, for example, α1 may differ from α3 and α2 may differ from α4. In each sub-sector 225α1, 225α2, 225α3, and 225α4 in FIG. 18, current set points for each electrical conductor can be determined by positions of magnet arrays of a mover relative to the electrical conductors according to suitable commutation laws, such as but not being limited to three-phase sinusoidal commutation. The spacing of electrical conductors in the transverse direction (or pitch) can be designed based on a spatial period of a magnet array of a mover, and on a number of electrical conductor phases within one magnet array spatial period. For example, for a three-phase design, the pitch can be about the spatial period of the magnet array divided by 3n, where n is an integer number. If the magnet array spatial period is 60 millimeters (mm), for example, then the conductor pitch can be close to 5 mm, 10 mm, or 20 mm, for example.

In the embodiment shown in FIG. 18, the electrical conductors 224α1 and the electrical conductors 224α3 overlap partially along their lengths in a plane including directions in which the electrical conductors 224α1 and 224α3 extend, but are spaced apart from each other in such a plane in a direction transverse to their lengths. Also in the embodiment shown in FIG. 18, the electrical conductors 224α2 and the electrical conductors 224α4 overlap partially along their lengths in a plane including directions in which the electrical conductors 224α2 and 224α4 extend, but are spaced apart from each other in such a plane in a direction transverse to their lengths. Of course alternative embodiments may differ.

Figure 19:
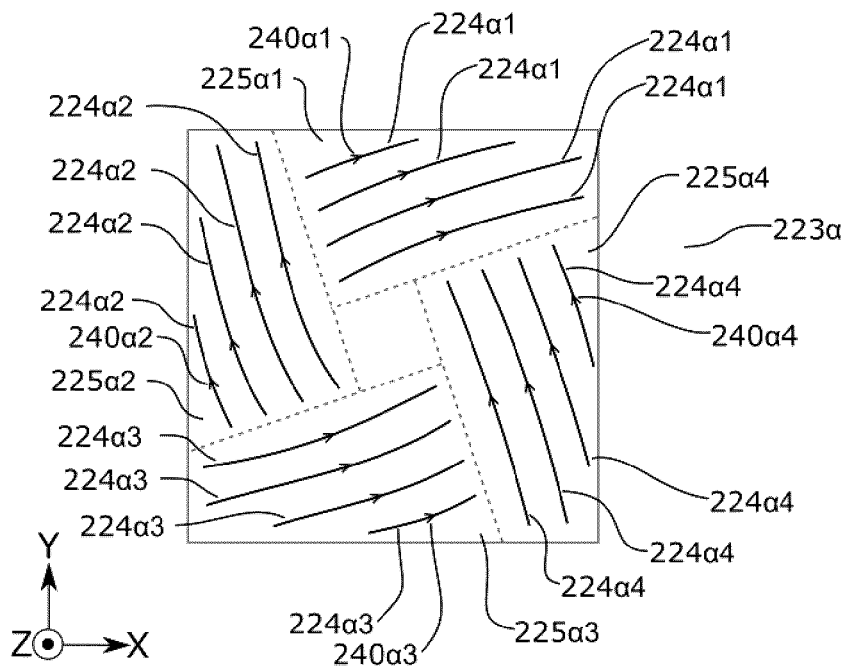
FIG. 19 illustrates electrical conductors according to another embodiment.

As indicated above, the electrical conductors in FIG. 18 are linear but may be curvilinear or include one or more curved segments in other embodiments, as shown in FIG. 19, for example. In the embodiment of FIG. 19, the first sub-sector 225α1 comprises a first plurality of curvilinear electrical conductors 224α1 elongated along a first curvilinear direction. The second sub-sector 225α2 comprises a second plurality of curvilinear electrical conductors 224α2 elongated along a second curvilinear direction. The third sub-sector 225α3 comprises a third plurality of electrical conductors 224α3 elongated along a third curvilinear direction. The fourth sub-sector 225α4 comprises a fourth plurality of electrical conductors 224α4 elongated along a fourth curvilinear direction. The electrical conductors 224α1, 224α2, 224α3, and 224α4 may be driven by an amplifier sub-module with current 240α1, 240α2, 240α3, and 240α4 respectively with suitable amount. The curve of a curvilinear direction may be generally gradual with an angle between a start and an end tangent typically being less than 45°. Although FIG. 18 illustrates four sub-sectors, alternative embodiments may include more or fewer sub-sectors, such as two or more sub-sectors, for example. In the embodiment shown, the curvilinear directions could be approximated to follow corresponding linear directions, where α2=α1+90°, α3=α1, α4=α2, and α1 is between 15° and 45°, for example 30°, although alternative embodiments may differ and, for example, α1 may differ from α3 and α2 may differ from α4.

In the embodiment shown in FIG. 19, the electrical conductors 224α1 and the electrical conductors 224α3 overlap partially along their lengths in a plane including directions in which the electrical conductors 224α1 and 224α3 extend, but are spaced apart from each other in such a plane in a direction transverse to their lengths. Also in the embodiment shown in FIG. 19, the electrical conductors 224α2 and the electrical conductors 224α4 overlap partially along their lengths in a plane including directions in which the electrical conductors 224α2 and 224α4 extend, but are spaced apart from each other in such a plane in a direction transverse to their lengths. Of course alternative embodiments may differ.

Figure 20:
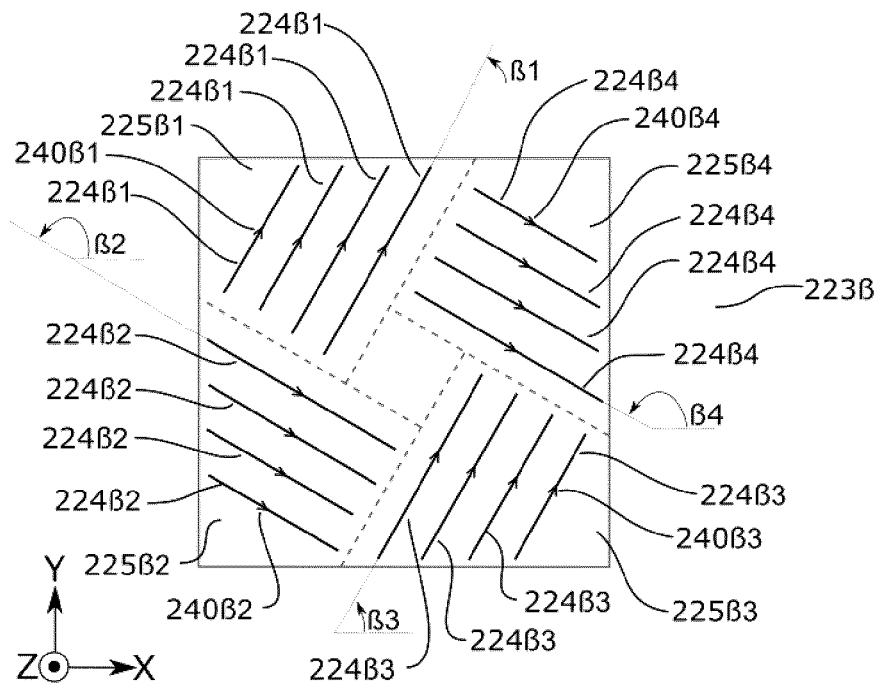
FIG. 20 illustrates electrical conductors in another layer of the motor sub-module of FIG. 17.

FIG. 20 illustrates electrical conductors 224β1 in a sub-sector 225β1, electrical conductors 224β2 in a sub-sector 225β2, electrical conductors 224β3 in a sub-sector 225β3, and electrical conductors 224β4 in a sub-sector 225β4 of the third layer 223β. The electrical conductors 224β1 extend at an angle β1 around the Z axis from the X axis, the electrical conductors 224β2 extend at an angle β2 around the Z axis from the X axis, the electrical conductors 224β3 extend at an angle β3 around the Z axis from the X axis, and the electrical conductors 224β4 extend at an angle β4 around the Z axis from the X axis. The electrical conductors in FIG. 20 are linear but may be curvilinear or include one or more curved segments in other embodiments. Further, although FIG. 20 illustrates four sub-sectors, alternative embodiments may include more or fewer sub-sectors, such as two or more sub-sectors, for example. In general, electrical conductors of one such sub-sector may be nonparallel to electrical conductors of another such sub-sector, and the electrical conductors of such sub-sectors may be in a common layer. Further, the electrical conductors of such sub-sectors may be nonparallel to the electrical conductors of another layer, such as the electrical conductors of the first layer 223X, of the second layer 223Y, of the third layer 223α, or of two or more thereof, for example. Electrical currents 240β1, 240β2, 240β3, 240β4 in the electrical conductors 224β1, 224β2, 224β3, 224β4 respectively may be controlled as described above, for example. In the embodiment shown, β2=β1+90°, β3=β1, β4=β2, and β1 is between 45° and 75°, for example 60°, although alternative embodiments may differ and, for example, β1 may differ from β3 and β2 may differ from β4.

In the embodiment shown in FIG. 20, the electrical conductors 224β1 and the electrical conductors 224β3 overlap partially along their lengths in a plane including directions in which the electrical conductors 224β1 and 224β3 extend, but are spaced apart from each other in such a plane in a direction transverse to their lengths. Also in the embodiment shown in FIG. 18, the electrical conductors 224β2 and the electrical conductors 224β4 overlap partially along their lengths in a plane including directions in which the electrical conductors 224β2 and 224β4 extend, but are spaced apart from each other in such a plane in a direction transverse to their lengths. Of course alternative embodiments may differ.

Further, in the Z direction (or, more generally, in a direction nonparallel or orthogonal to directions of the electrical conductors of the first, second, third, and fourth layers 223X, 223Y, 223α, and 223β), the sub-sector 225β1 may at least partially overlap the sub-sectors 225α1 and 225α2, the sub-sector 225β2 may at least partially overlap the sub-sectors 225α2 and 225α3, the sub-sector 225β3 may at least partially overlap the sub-sectors 225α3 and 225α4, and the sub-sector 225β4 may at least partially overlap the sub-sectors 225α4 and 225α1.

In general, embodiments such as the motor sub-module of FIG. 17 include electrical conductors that extend along portions of a working surface within 15° of each other, or along at least four different directions, and that at least partially overlap in a direction nonparallel or orthogonal to directions of the electrical conductors.

As shown from FIG. 21 to FIG. 27, the motor sub-module of FIG. 17 may significantly extend controllable rotary motion range around the Z axis.

Figure 21:
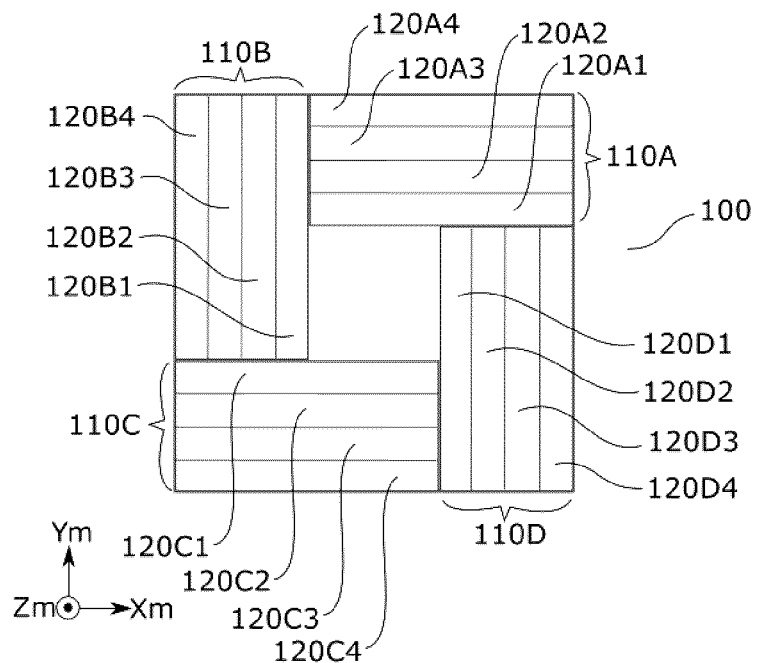
FIG. 21 is a plan view of magnet arrays of a mover according to one embodiment.
Figure 22:
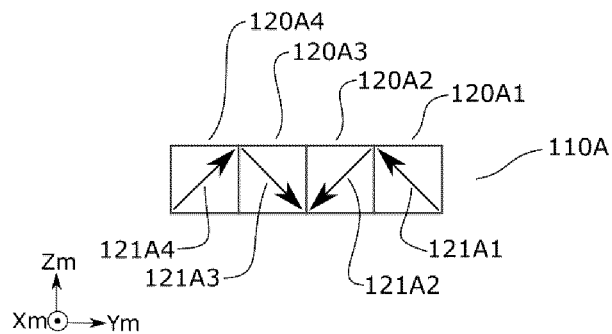
FIG. 22 is an elevation view of one of the magnet arrays of the mover of FIG. 21.

FIG. 21 shows a particular embodiment of a mover 100. The mover 100 includes a magnet assembly including four magnet arrays 110A, 110B, 110C, and 110D. Each of the magnet arrays 110A, 110B, 110C, and 110D includes a plurality of linearly elongated magnetization segments (such as permanent magnets, for example), each having a magnetization direction that may be orthogonal to its elongation direction. For example, the magnet array 110A includes magnetization segments 120A1, 120A2, 120A3, and 120A4 as shown in FIG. 21 and in FIG. 22. As shown in FIG. 22, the magnetization segments 120A1, 120A2, 120A3, and 120A4 may have magnetization directions 121A1, 121A2, 121A3, and 121A4. Each such magnetization segment may include a plurality of magnet pieces, which may be oriented in a particular pattern to generate a strong magnetic force on the bottom side of the mover. In this particular non-limiting embodiment, each magnet array includes four magnets, but alternative embodiments may include more, fewer, or different magnets.

Figure 23:
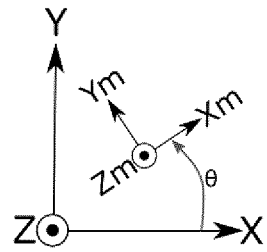
FIG. 23 shows two coordinate systems that may describe some embodiments.

FIG. 23 shows two coordinate systems that may describe some embodiments. As indicated above, Cartesian axes identified as X, Y, and Z may be fixed relative to a stator, and Cartesian axes identified as Xm, Ym, and Zm may be fixed relative to a mover such as the mover 100. However, alternative embodiments may differ, and embodiments such as those described herein are not limited to or limited by any particular axes. A relative angle between the stator and mover axes X and Xm when projected onto the XY plane of the stator work surface may be defined as θm. This angle θm may be utilized in other embodiments to describe the relative orientation between the two coordinate systems.

Figure 24:
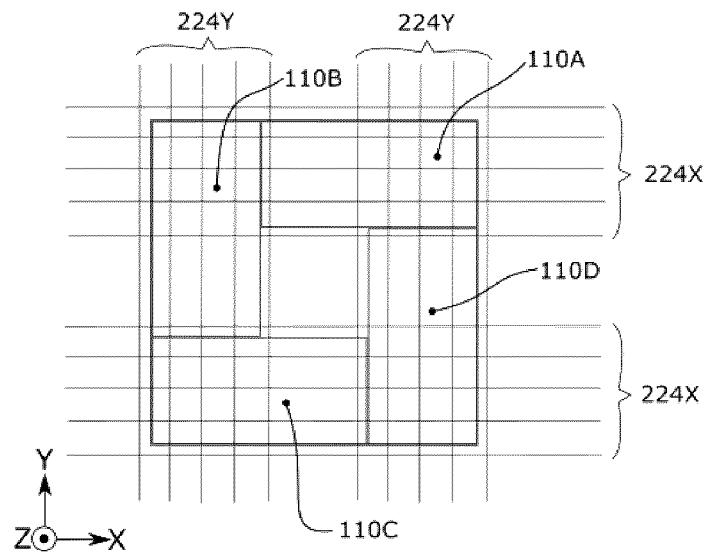
FIG. 24 shows a mover-stator interaction according to one embodiment.

FIG. 24 shows a mover-stator interaction according to one embodiment in which the magnet arrays 110A and 110C interact with the electrical conductors 224X and the magnet arrays 110B and 110D interact with the electrical conductors 224Y. In such an embodiment, the electrical conductors 224X and the electrical conductors 224Y may cause rotation of the mover 100 around the Z axis by about 15° in either direction around the Z axis such that −15°<θm<15°.

Figure 25:
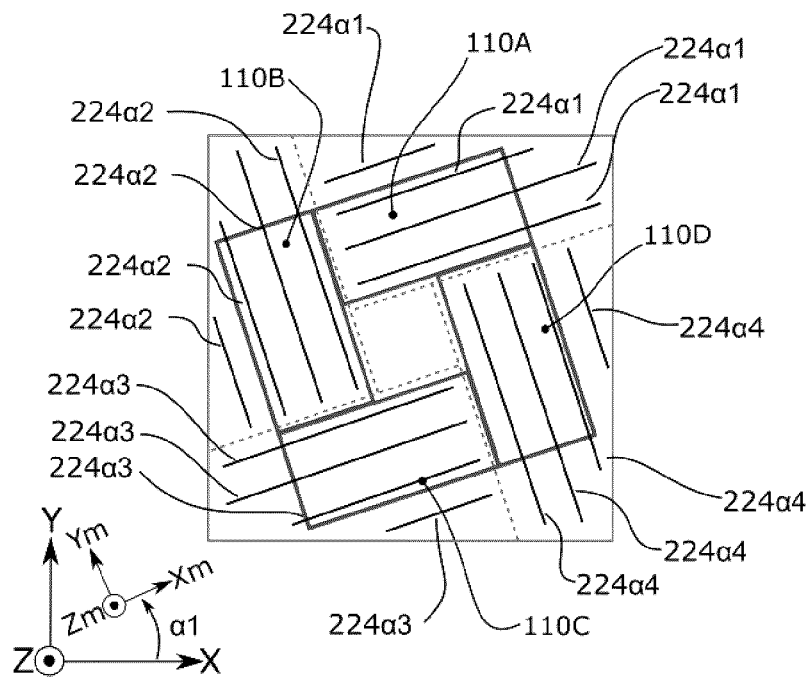
FIG. 25 shows a mover-stator interaction according to another embodiment.

FIG. 25 shows a mover-stator interaction according to another embodiment in which the magnet array 110A interacts with the electrical conductors 224α1, the magnet array 110B interacts with the electrical conductors 224α2, the magnet array 110C interacts with the electrical conductors 224α3, and the magnet array 110D interacts with the electrical conductors 224α4. Again, in such an embodiment, the electrical conductors 224α1, 224α2, 224α3, and 224α4 may cause rotation of the mover 100 around the Z axis by about 15° in either direction around the Z axis such that α1−15°<θm<α1+15°.

Therefore, the magnet arrays 110A and 110C may interact with the electrical conductors 224X and the magnet arrays 110B and 110D may interact with the electrical conductors 224Y to rotate the mover 100 from the orientation shown in FIG. 24 towards the orientation shown in FIG. 25, and then the magnet arrays 110A, 110B, 110C, and 110D may interact with the electrical conductors 224α1, 224α2, 224α3, and 224α4 to rotate the mover 100 towards the orientation shown in FIG. 25, so that the electrical conductors 224X, 224Y, 224α1, 224α2, 224α3, and 224α4 may be controlled to cause the mover 100 to rotate from the orientation shown in FIG. 24 to the orientation shown in FIG. 25.

Figure 26:
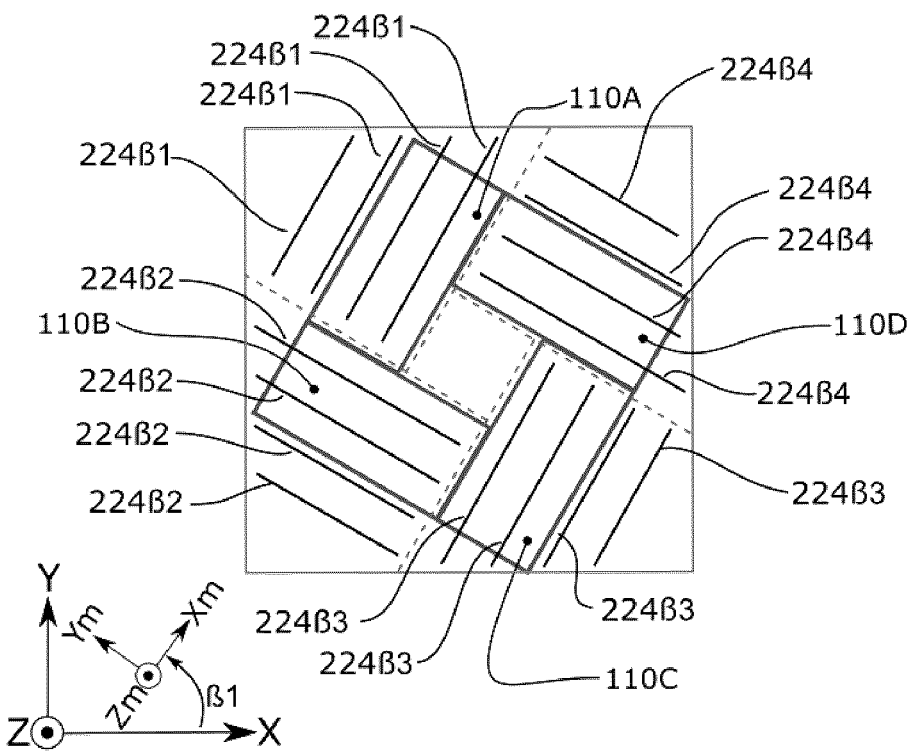
FIG. 26 shows a mover-stator interaction according to another embodiment.

FIG. 26 shows a mover-stator interaction according to another embodiment in which the magnet array 110A interacts with the electrical conductors 224β1, the magnet array 110B interacts with the electrical conductors 224β2, the magnet array 110C interacts with the electrical conductors 224β3, and the magnet array 110D interacts with the electrical conductors 224β4. Again, in such an embodiment, the electrical conductors 224β1, 224β2, 224β3, and 224β4 may cause rotation of the mover 100 around the Z axis by about 15° in either direction around the Z axis such that 131−15°<θm<131+15°.

Therefore, the magnet arrays 110A, 110B, 110C, and 110D may interact with the electrical conductors 224α1, 224α2, 224α3, and 224α4 to rotate the mover 100 from the orientation shown in FIG. 25 towards the orientation shown in FIG. 26, and then the magnet arrays 110A, 110B, 110C, and 110D may interact with the electrical conductors 224β1, 224β2, 224β3, and 224β4 to rotate the mover 100 towards the orientation shown in FIG. 26, so that the electrical conductors 224α1, 224α2, 224α3, 224α4, 224β1, 224β2, 224β3, and 224β4 may be controlled to cause the mover 100 to rotate from the orientation shown in FIG. 25 to the orientation shown in FIG. 26.

Figure 27:
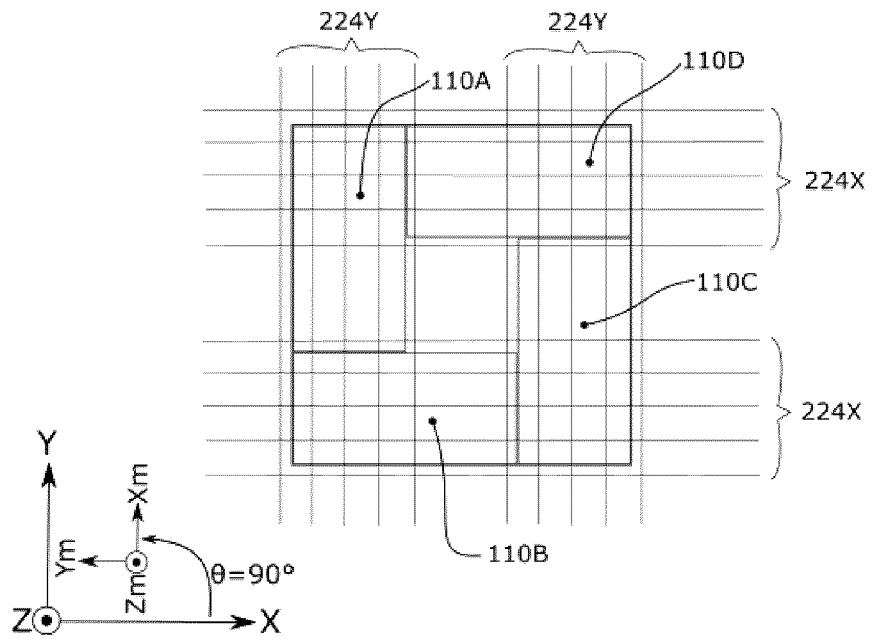
FIG. 27 shows a mover-stator interaction according to another embodiment.

FIG. 27 shows a mover-stator interaction according to one embodiment in which the magnet arrays 110A and 110C interact with the electrical conductors 224Y and the magnet arrays 110B and 110D interact with the electrical conductors 224X. In such an embodiment, the electrical conductors 224X and the electrical conductors 224Y may cause rotation of the mover 100 around the Z axis by about 15° in either direction around the Z axis such that 75°<θm<105°.

Therefore, the magnet arrays 110A, 110B, 110C, and 110D may interact with the electrical conductors 224β1, 224β2, 224β3, and 224β4 to rotate the mover 100 from the orientation shown in FIG. 26 towards the orientation shown in FIG. 27, and then the magnet arrays 110A and 110C may interact with the electrical conductors 224Y and the magnet arrays 110B and 110D may interact with the electrical conductors 224X to rotate the mover 100 towards the orientation shown in FIG. 27, so that the electrical conductors 224β1, 224β2, 224β3, 224β4, 224X, and 224Y may be controlled to cause the mover 100 to rotate from the orientation shown in FIG. 26 to the orientation shown in FIG. 27.

As shown in the examples from FIG. 24 to FIG. 27, the motor sub-module of FIG. 17 may rotate the mover 100 90° around the Z axis (or around an axis orthogonal or nonparallel to the working surface of a stator module including the motor sub-module of FIG. 17). More generally, the motor sub-module of FIG. 17 may rotate the mover 100 to any rotational position around the Z axis (or around an axis orthogonal or nonparallel to the working surface of a stator module including the motor sub-module of FIG. 17) by repeating variations of the examples from FIG. 24 to FIG. 27.

Of course the embodiments described above are examples only, and alternative embodiments may include other electrical conductors in one or more other of the same or different layers.

Figure 28:
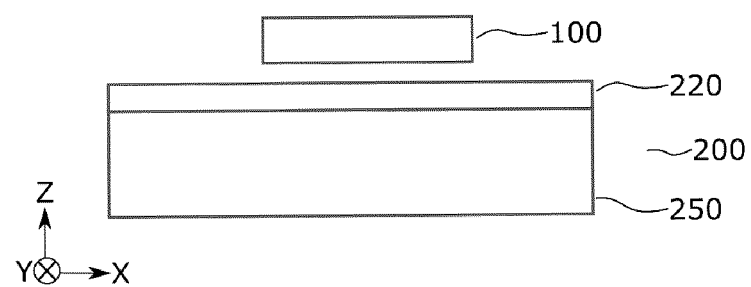
FIG. 28 is an elevation view of a robotic system according to one embodiment.
Figure 29:
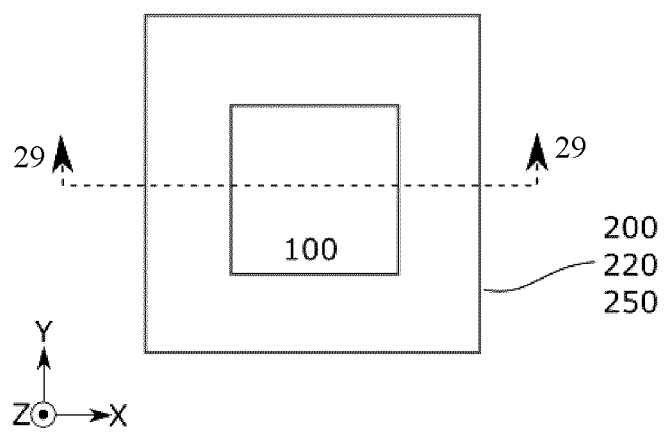
FIG. 29 is a top view of the robotic system of FIG. 28.
Figure 30:
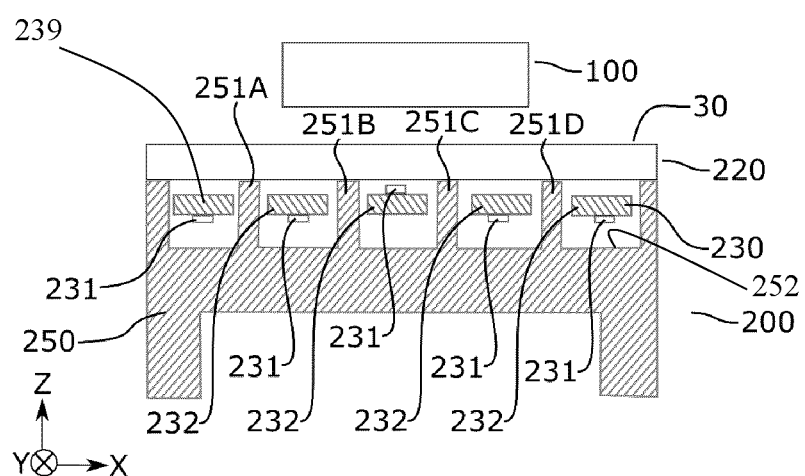
FIG. 30 is a cross-sectional view of the robotic system of FIG. 28, taken along the line 29-29 in FIG. 29.

FIG. 28, FIG. 29, and FIG. 30 illustrate a robotic system according to another embodiment and including a stator module 200 and a mover 100. The stator module 200 includes a working surface 30 and motor sub-module 220, which may be similar to the motor sub-modules described above and may include a plurality of electrical conductors in one or more layers as described above. The stator module 200 also includes a stator body 250 supporting the sub-modules and the working surfaces of the stator module.

Figure 31:
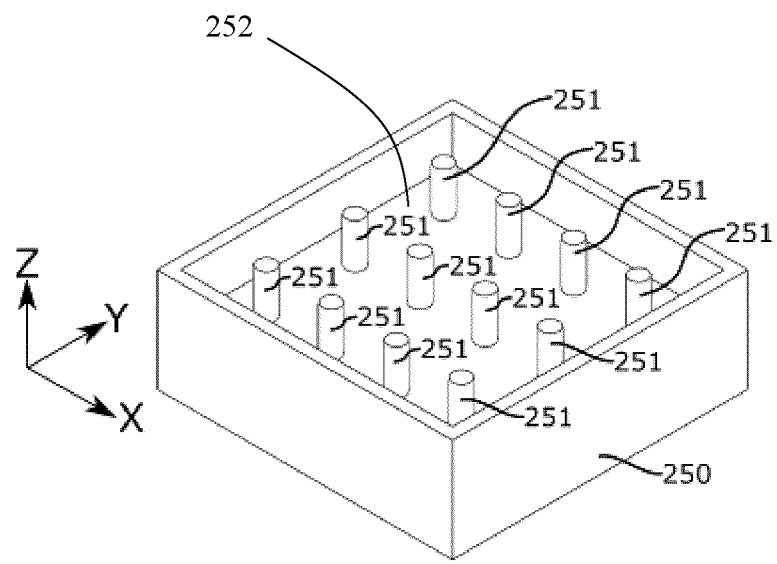
FIG. 31 is a perspective view of a stator body of the robotic system of FIG. 28.

As shown in FIG. 30 and FIG. 31, protrusions 251 (also shown as protrusions 251A, 251B, 251C, and 251D) protrude from a surface 252 of the stator body 250 and towards the motor sub-module 220. The protrusions 251 may be attached to the motor sub-module 220 directly or indirectly (by an attachment such as, without limitation, bonding, potting, welding, or soldering) to support the motor sub-module 220 relative to the stator body 250. Although the protrusions 251 are shown to be round, alternative embodiments may include other shapes such as square, rectangle, triangle, octagon, or hexagon, for example.

Figure 32:
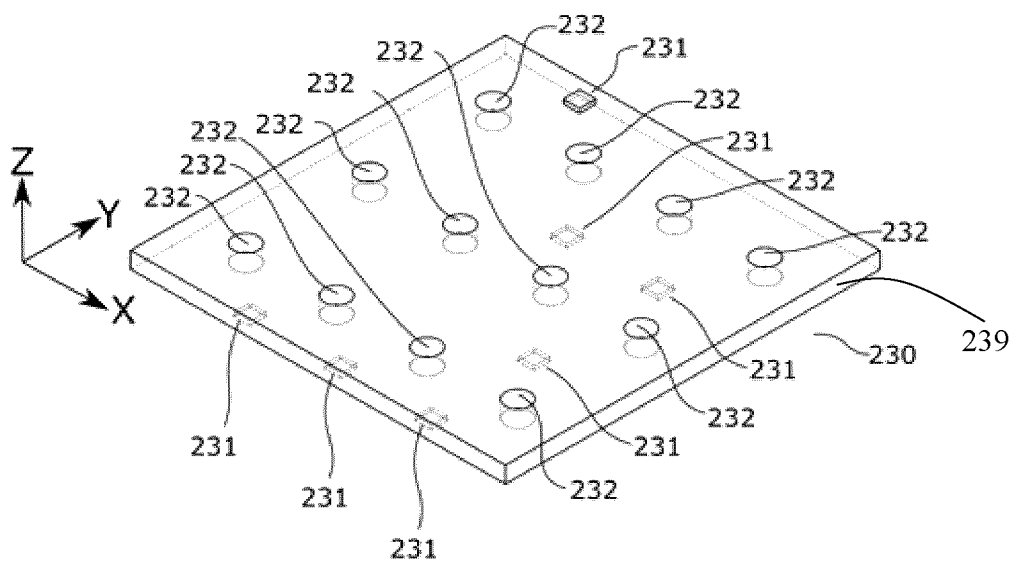
FIG. 32 is a perspective view of a position-sensor sub-module of the robotic system of FIG. 28.

As shown in FIG. 30 and FIG. 32, the stator module 200 includes a position-sensor sub-module 230, which includes a planar position-sensor body 239 defining through-holes 232 positioned to receive respective ones of the protrusions 251 when the position-sensor sub-module 230 is positioned between the surface 252 (from which the protrusions 251 protrude) and the motor sub-module 220. The position-sensor sub-module 230 at least one position sensor 231 on the position-sensor body 239. In general, one or more position sensors 231 may facilitate sensing a position of the mover 100 based on one or more physics principles such as, but not limited to, optical, capacitive, eddy current, inductive, magnetic, resistive, or a combination of two or more thereof.

In general, the protrusions 251 may transfer forces from the motor sub-module 220 to a portion of the stator body 250 on an opposite side of the position-sensor sub-module 230 from the motor sub-module 220. The portion of the stator body 250 on the opposite side of the position-sensor sub-module 230 from the motor sub-module 220 may be relatively large, the protrusions 251 may allow the motor sub-module 220 to be supported by a relatively large portion of the stator body 250 while allowing the position-sensor sub-module 230 to be relatively close to the motor sub-module 220. Further, any forces applied on the motor sub-module 220 by the mover 100 may be directly transferred to the portion of the stator body 250 on the opposite side of the position-sensor sub-module 230 from the motor sub-module 220 without being transferred to the position-sensor sub-module 230. In other words, the protrusions 251 may create load paths between the motor sub-module 220 and the portion of the stator body 250 on the opposite side of the position-sensor sub-module 230 from the motor sub-module 220 that may not necessarily transmit loads to the position-sensor sub-module 230, which may protect the position-sensor sub-module 230 from receiving potentially damaging load forces such that mechanical stress on the position-sensor sub-module 230 may be reduced, which may avoid damage to the position-sensor sub-module 230.

In general, embodiments such as those described herein may move one or more parts, such as but not limited to one or more biological samples, one or more devices, one or more drugs (which may be in suitable containers), one or more products being assembled, one or more raw parts, one or more materials, or a combination of two or more thereof, for example. Therefore, embodiments such as those described herein may be a magnetic movement apparatus or a moveable robot system that may include one or more moveable robotic devices. Embodiments such as those described herein may be used in the automation of various processes including packaging where workpieces need to be transported, sorted, weighed, or packaged, for example. Therefore, robotic systems such as those described herein for example may function as assembly systems or as other systems for packaging, transferring, printing, inspecting, analyzing, or filling, for example.

This disclosure includes the following other examples as further illustrations of embodiments of the disclosure, which are not intended to limit the scope of the disclosure.

1. A stator module comprising:
 a stator body;
 a working surface extending by a width in a first dimension between first and second exposed opposite sides of the stator module, the working surface further extending by a length in a second dimension between first and second opposite ends of the stator module, the second dimension different from the first dimension, the length greater than the width; and
 a plurality of electrical conductors, each electrical conductor of the plurality of electrical conductors extending along a respective portion of the working surface and operable to generate a magnetic field to facilitate moving, relative to the working surface, a magnetized mover in the magnetic field in response to electrical current through the electrical conductor;
 at least some electrical conductors of the plurality of electrical conductors in a first layer of electrical conductors of the plurality of electrical conductors extending in a first electrical conductor direction; and
 at least some electrical conductors of the plurality of electrical conductors in a second layer of electrical conductors of the plurality of electrical conductors separate from the first layer of electrical conductors extending in a second electrical conductor direction nonparallel to the first electrical conductor direction;
 the at least some electrical conductors of the plurality of electrical conductors in the first layer at least partially overlapping the at least some electrical conductors of the plurality of electrical conductors in the second layer in a direction orthogonal to the first and second electrical conductor directions;
 wherein the plurality of electrical conductors and the working surface are supported relative to the stator body such that the stator module is a unitary assembly.

2. The stator module of example 1 wherein at least some electrical conductors of the plurality of electrical conductors extend transversely relative to the working surface and entirely across at least a portion of the width of the working surface.

3. The stator module of example 2 wherein all of the electrical conductors of the stator module that extend along respective portions of the working surface and transversely relative to the working surface are within the at least a portion of the width of the working surface.

4. The stator module of example 2 wherein all of the electrical conductors of the stator module that extend along respective portions of the working surface and transversely relative to the working surface extend entirely across the at least a portion of the width of the working surface.

5. The stator module of example 2, 3, or 4 wherein the working surface covers a single row of electromagnetic driving regions, each electromagnetic driving region of the single row of electromagnetic driving regions comprising a respective subset of the plurality of electrical conductors that extend entirely across the at least a portion of the width of the working surface.

6. The stator module of example 5 wherein each electrical conductor of the respective subset of the plurality of electrical conductors of each electromagnetic driving region of the single row of electromagnetic driving regions extends substantially across the electromagnetic driving region.

7. The stator module of example 5 or 6 wherein the single row of electromagnetic driving regions comprises two electromagnetic driving regions.

8. The stator module of example 5, 6, or 7 wherein the single row of electromagnetic driving regions comprises four electromagnetic driving regions.

9. The stator module of example 5, 6, or 7 wherein each electromagnetic driving region of the single row of electromagnetic driving regions comprises:
 a respective subset of the at least some electrical conductors of the plurality of electrical conductors in the first layer of electrical conductors; and
 a respective subset of the at least some electrical conductors of the plurality of electrical conductors in the second layer of electrical conductors.

10. The stator module of any one of examples 2 to 9 wherein at least some electrical conductors of the plurality of electrical conductors extend longitudinally relative to the working surface.

11. The stator module of example 10 wherein the at least some electrical conductors of the plurality of electrical conductors extend transversely relative to the working surface are orthogonal to the at least some electrical conductors of the plurality of electrical conductors that extend longitudinally relative to the working surface.

12. The stator module of example 10 or 11, when directly or indirectly dependent from example 5, wherein each electromagnetic driving region of the single row of electromagnetic driving regions comprises a respective subset of the plurality of electrical conductors that extend longitudinally relative to the working surface.

13. The stator module of example 12 wherein the respective subset of the plurality of electrical conductors that extend longitudinally relative to the working surface of each electromagnetic driving region of the single row of electromagnetic driving regions is distinct from each respective subset of the plurality of electrical conductors that extend longitudinally relative to the working surface of each other electromagnetic driving region of the single row of electromagnetic driving regions.

14. The stator module of any one of examples 1 to 13 wherein each electromagnetic driving region of the plurality of electromagnetic driving regions abuts an adjacent at least one of the plurality of electromagnetic driving regions.

15. The stator module of any one of examples 1 to 14 wherein the stator module is substantially rectangular.

16. The stator module of any one of examples 1 to 15 wherein the working surface is substantially rectangular.

17. The stator module of any one of examples 1 to 14 wherein:
the working surface is in a plane;
the working surface is at least partially curved in the plane;
the width is a width between at-least-partially-curved sides of the working surface; and
the length comprises at least one curve length.

18. The stator module of any one of examples 1 to 17 wherein the stator module further comprises at least one guide positioned to guide movement of the mover relative to the stator module along the length of the working surface.

19. The stator module of example 18 wherein the at least one guide comprises at least one rail.

20. A stator module comprising:
a stator body;
a working surface supported relative to the stator body; and
a plurality of electrical conductors, each electrical conductor of the plurality of electrical conductors extending along a respective portion of the working surface and operable to generate a magnetic field to facilitate moving, relative to the working surface, a magnetized mover in the magnetic field in response to electrical current through the electrical conductor;
at least some electrical conductors of the plurality of electrical conductors in a first layer of electrical conductors of the plurality of electrical conductors extending in a first electrical conductor direction;
at least some electrical conductors of the plurality of electrical conductors in the first layer of electrical conductors of the plurality of electrical conductors extending in a second electrical conductor direction nonparallel to the first electrical conductor direction; and
at least some electrical conductors of the plurality of electrical conductors in a second layer of electrical conductors of the plurality of electrical conductors separate from the first layer of electrical conductors extending in a third electrical conductor direction nonparallel to the first electrical conductor direction and nonparallel to the second electrical conductor direction.

21. The stator module of example 20 wherein the first electrical conductor direction is orthogonal to the second electrical conductor direction.

22. The stator module of example 20 or 21 wherein the first electrical conductor direction is linear.

23. The stator module of example 20, 21, or 22 wherein the second electrical conductor direction is linear.

24. The stator module of example 20, 21, 22, or 23 wherein the third electrical conductor direction is curvilinear.

25. The stator module of any one of examples 20 to 24 wherein the at least some electrical conductors extending in the first electrical conductor direction at least partially overlap, in a direction orthogonal to the first and second electrical conductor directions, with the at least some electrical conductors extending in the third electrical conductor direction.

26. The stator module of any one of examples 20 to 25 wherein the at least some electrical conductors extending in the second electrical conductor direction at least partially overlap, in a direction orthogonal to the second and third electrical conductor directions, with the at least some electrical conductors extending in the third electrical conductor direction.

27. The stator module of any one of examples 20 to 26 wherein at least some electrical conductors of the plurality of electrical conductors are in a third layer of electrical conductors of the plurality of electrical conductors separate from the first and second layers of electrical conductors and extend in a fourth electrical conductor direction nonparallel to the first electrical conductor direction, nonparallel to the second electrical conductor direction, and nonparallel to the third electrical conductor direction.

28. The stator module of example 27 wherein the third electrical conductor direction is orthogonal to the fourth electrical conductor direction.

29. The stator module of example 27 or 28 wherein the fourth electrical conductor direction is curvilinear.

30. The stator module of example 27, 28, or 29 wherein the at least some electrical conductors extending in the first electrical conductor direction at least partially overlap, in a direction orthogonal to the first and fourth electrical conductor directions, with the at least some electrical conductors extending in the fourth electrical conductor direction.

31. The stator module of example 27, 28, 29, or 30 wherein the at least some electrical conductors extending in the second electrical conductor direction at least partially overlap, in a direction orthogonal to the second and fourth electrical conductor directions, with the at least some electrical conductors extending in the fourth electrical conductor direction.

32. A stator module comprising:
a stator body;
a working surface supported relative to the stator body;
a motor sub-module comprising a plurality of electrical conductors, each electrical conductor of the plurality of electrical conductors extending along a respective portion of the working surface and operable to generate a magnetic field to facilitate moving, relative to the working surface, a magnetized mover in the magnetic field in response to electrical current through the electrical conductor; and
a position-sensor sub-module comprising at least one position sensor operable to sense a position of the mover and defining a plurality of through-holes;
wherein the stator body comprises a surface and a plurality of protrusions, each protrusion of the plurality of protrusions extending from the surface, towards the motor sub-module, and through a respective through-hole of the plurality of through-holes of the position-sensor sub-module and supporting the motor sub-module.

33. The stator module of example 32 wherein the position-sensor sub-module comprises a position-sensor body defining the plurality of through-holes and supporting the at least one position sensor.

34. The stator module of example 33 wherein the position-sensor body is planar.

35. The stator module of example 32, 33, or 34 wherein the plurality of protrusions are spaced apart from each other in at least two dimensions.

36. The stator module of example 32, 33, or 34 wherein the plurality of protrusions are arranged in at least two rows and in at least two columns.

37. A robotic system comprising at least one stator module comprising a first stator module according to any one of examples 32 to 36.

38. A robotic system comprising at least one stator module comprising a first stator module according to any one of examples 20 to 31.

39. A robotic system comprising at least one stator module comprising a first stator module according to any one of examples 1 to 19.

40. The robotic system of example 39 wherein the at least one stator module further comprises a second stator module comprising:
a stator body;
a working surface supported relative to the stator body and having a side adjacent the first stator module, the side of the working surface of the second stator module having a greater extent than the width of the working surface of the first stator module; and
a plurality of electrical conductors, each electrical conductor of the plurality of electrical conductors extending along a respective portion of the working surface and operable to generate a magnetic field to facilitate moving, relative to the working surface, the magnetized mover in the magnetic field in response to electrical current through the electrical conductor;
wherein the robotic system is operable to move the magnetized mover between the working surface of the first stator module and the working surface of the second stator module in response to electrical current through at least one electrical conductor of the pluralities of electrical conductors of the first and second stator modules.

41. The robotic system of example 40 wherein the side of the working surface of the second stator module is adjacent the first end of the first stator module.

42. The robotic system of example 40 or 41 wherein the side of the working surface of the second stator module abuts the first end of the first stator module.

43. The robotic system of example 40, 41, or 42 wherein the first stator module abuts the second stator module.

44. The robotic system of example 40, 41, 42, or 43 wherein the second stator module comprises a plurality of electromagnetic driving regions, each electromagnetic driving region of the second stator module comprising a respective subset of the plurality of electrical conductors of the second stator module.

45. The robotic system of example 44 wherein the plurality of electromagnetic driving regions of the second stator module are in respective ones of a plurality of rows and respective ones of a plurality of columns of the plurality of electromagnetic driving regions of the second stator module.

46. The robotic system of example 44 wherein the plurality of electromagnetic driving regions of the second stator module are in a single row.

47. The robotic system of any one of examples 40 to 46 wherein the working surface of the second stator module has a width and a length equal to the width.

48. The robotic system of any one of examples 40 to 46 wherein the working surface of the second stator module has a width and a length greater than the width.

49. The robotic system of example 48 wherein the side of the working surface of the second stator module extends along the width of the working surface of the second stator module.

50. The robotic system of example 48 wherein the side of the working surface of the second stator module extends along the length of the working surface of the second stator module.

51. The robotic system of any one of examples 40 to 50 wherein, in the second stator module:
at least some electrical conductors of the plurality of electrical conductors are in a first layer of electrical conductors of the plurality of electrical conductors extending in a first electrical conductor direction;
at least some electrical conductors of the plurality of electrical conductors are in a second layer of electrical conductors of the plurality of electrical conductors separate from the first layer of electrical conductors extending in a second electrical conductor direction nonparallel to the first electrical conductor direction; and
the at least some electrical conductors of the plurality of electrical conductors in the first layer at least partially overlap the at least some electrical conductors of the plurality of electrical conductors in the second layer in a direction orthogonal to the first and second electrical conductor directions.

52. The stator module of example 51, when directly or indirectly dependent from example 44, wherein, in the second stator module, each electromagnetic driving region of the plurality of electromagnetic driving regions comprises:
a respective subset of the at least some electrical conductors of the plurality of electrical conductors in the first layer of electrical conductors; and
a respective subset of the at least some electrical conductors of the plurality of electrical conductors in the second layer of electrical conductors.

53. The robotic system of any one of examples 38 to 52 wherein each stator module of the at least one stator module further comprises a respective position-sensor sub-module operable to sense a position of the mover.

54. The robotic system of any one of examples 33 to 53 further comprising the mover.

55. The robotic system of example 54 wherein the mover comprises a plurality of permanent magnets.

56. The robotic system of example 55 wherein:
at least some of the plurality of permanent magnets are magnetized in a first magnetization direction; and
at least some of the plurality of permanent magnets are magnetized in a second magnetization direction nonparallel to the first magnetization direction.

57. The robotic system of example 54, 55, or 56, when indirectly dependent from example 19, wherein the mover comprises at least one roller operable to roll on the at least one rail such that the at least one roller rolling on the at least one rail guides movement of the mover relative to the stator module along the length of the working surface.

58. The robotic system of example 54, 55, or 56, when indirectly dependent from example 19, wherein the mover comprises at least one slider operable to slide on the at least one rail such that the at least one roller rolling on the at least one rail guides movement of the mover relative to the stator module along the length of the working surface.

59. The robotic system of example 54, 55, or 56, when indirectly dependent from example 19, wherein the mover comprises at least one contact surface roller operable to contact the at least one rail such that the at least one contact surface contacting the at least one rail guides movement of the mover relative to the stator module along the length of the working surface.

60. The robotic system of any one of examples 33 to 59 further comprising a control system operable to, at least, directly or indirectly control electrical current through each electrical conductor of the plurality of electrical conductors of each stator module of the at least one stator module to cause the mover to move relative to the at least one stator module.

61. The robotic system of example 60 wherein the control system is a control circuit.

62. The robotic system of example 60 or 61 wherein the control system is operable to, at least, directly or indirectly control electrical current through at least some electrical conductors of the plurality of electrical conductors of the first stator module to cause the mover to move in a longitudinal direction relative to the first stator module between the first and second ends of the first stator module.

63. The robotic system of example 60, 61, or 62 wherein each stator module of the at least one stator module further comprises at least one amplifier operable to amplify control signals generated at least partially based on at least one signal received from the control system to control each electrical conductor of the plurality of electrical conductors of each stator module of the at least one stator module to cause the mover to move relative to the at least one stator module.

64. The robotic system of any one of examples 33 to 63 wherein the stator body of each stator module of the at least one stator module is a unitary body supporting the plurality of electrical conductors of the stator module.

65. The robotic system of any one of examples 33 to 64 wherein each stator module of the at least one stator module comprises electrical circuitry common to the plurality of electrical conductors of the stator module and operable to control electrical current through each electrical conductor of the plurality of electrical conductors of the stator module.

66. The robotic system of example 65 wherein, in each stator module of the at least one stator module, the electrical circuitry is housed within the stator body.

67. The robotic system of any one of examples 33 to 66 wherein each stator module of the at least one stator module comprises a communication device operable to communicate data between the stator module and one or more other stator modules.

68. The robotic system of example 67 wherein, in each stator module of the at least one stator module, the communication device is housed within the stator body.

Although specific embodiments have been described and illustrated, such embodiments should be considered illustrative only and not as limiting the invention as construed according to the accompanying claims.

The invention claimed is:

1. A stator module comprising:
a stator body;
a working surface supported relative to the stator body and extending by a width in a first dimension between first and second exposed opposite sides of the stator module, the working surface further extending by a length in a second dimension between first and second opposite ends of the stator module, the second dimension different from the first dimension, the length greater than the width; and
a plurality of electrical conductors, each electrical conductor of the plurality of electrical conductors extending along a respective portion of the working surface and operable to generate a magnetic field to facilitate moving, relative to the working surface, a magnetized mover in the magnetic field in response to electrical current through the electrical conductor;
at least some electrical conductors of the plurality of electrical conductors in a first layer of electrical conductors of the plurality of electrical conductors extending in a first electrical conductor direction; and
at least some electrical conductors of the plurality of electrical conductors in a second layer of electrical conductors of the plurality of electrical conductors separate from the first layer of electrical conductors and extending in a second electrical conductor direction nonparallel to the first electrical conductor direction;
the at least some electrical conductors of the plurality of electrical conductors in the first layer at least partially overlapping the at least some electrical conductors of the plurality of electrical conductors in the second layer in a direction orthogonal to the first and second electrical conductor directions;
wherein the plurality of electrical conductors and the working surface are supported relative to the stator body such that the stator module is a unitary assembly.

2. The stator module of claim 1 wherein at least some electrical conductors of the plurality of electrical conductors extend transversely relative to the working surface and entirely across at least a portion of the width of the working surface.

3. The stator module of claim 2 wherein all of the electrical conductors of the stator module that extend along respective portions of the working surface and transversely relative to the working surface are within the at least a portion of the width of the working surface.

4. The stator module of claim 2, wherein the working surface covers a single row of electromagnetic driving regions, each electromagnetic driving region of the single row of electromagnetic driving regions comprising a respective subset of the plurality of electrical conductors that extend entirely across the at least a portion of the width of the working surface, and wherein each electromagnetic driving region of the single row of electromagnetic driving regions comprises:
a respective subset of the at least some electrical conductors of the plurality of electrical conductors in the first layer of electrical conductors; and
a respective subset of the at least some electrical conductors of the plurality of electrical conductors in the second layer of electrical conductors.

5. The stator module of claim 2 wherein at least some electrical conductors of the plurality of electrical conductors extend longitudinally relative to the working surface.

6. The stator module of claim 4 wherein at least some electrical conductors of the plurality of electrical conductors extend longitudinally relative to the working surface, and wherein each electromagnetic driving region of the single row of electromagnetic driving regions comprises a respective subset of the plurality of electrical conductors that extend longitudinally relative to the working surface.

7. A robotic system comprising at least one stator module comprising a first stator module according to claim 1, wherein the at least one stator module further comprises a second stator module comprising:
a stator body;
a working surface supported relative to the stator body and having a side adjacent the first stator module, the side of the working surface of the second stator module having a greater extent than the width of the working surface of the first stator module; and a plurality of electrical conductors, each electrical conductor of the plurality of electrical conductors extending along a respective portion of the working surface and operable to generate a magnetic field to facilitate moving, relative to the working surface, the magnetized mover in the magnetic field in response to electrical current through the electrical conductor;

wherein the robotic system is operable to move the magnetized mover between the working surface of the first stator module and the working surface of the second stator module in response to electrical current through at least one electrical conductor of the pluralities of electrical conductors of the first and second stator modules.

8. The robotic system of claim 7 wherein the second stator module comprises a plurality of electromagnetic driving regions, each electromagnetic driving region of the second stator module comprising a respective subset of the plurality of electrical conductors of the second stator module.

9. The robotic system of claim 8 wherein, in the second stator module:

at least some electrical conductors of the plurality of electrical conductors are in a first layer of electrical conductors of the plurality of electrical conductors extending in a first electrical conductor direction;

at least some electrical conductors of the plurality of electrical conductors are in a second layer of electrical conductors of the plurality of electrical conductors separate from the first layer of electrical conductors and extending in a second electrical conductor direction nonparallel to the first electrical conductor direction; and the at least some electrical conductors of the plurality of electrical conductors in the first layer at least partially overlap the at least some electrical conductors of the plurality of electrical conductors in the second layer in a direction orthogonal to the first and second electrical conductor directions.

10. The stator module of claim 9 wherein, in the second stator module, each electromagnetic driving region of the plurality of electromagnetic driving regions comprises:

a respective subset of the at least some electrical conductors of the plurality of electrical conductors in the first layer of electrical conductors; and a respective subset of the at least some electrical conductors of the plurality of electrical conductors in the second layer of electrical conductors.

11. The stator module of claim 6 wherein the respective subset of the plurality of electrical conductors that extend longitudinally relative to the working surface of each electromagnetic driving region of the single row of electromagnetic driving regions is distinct from each respective subset of the plurality of electrical conductors that extend longitudinally relative to the working surface of each other electromagnetic driving region of the single row of electromagnetic driving regions.

12. The stator module of claim 8 wherein the plurality of electromagnetic driving regions of the second stator module are in a single row.

13. The stator module of claim 4 wherein the single row of electromagnetic driving regions consists of two, three, or four of the electromagnetic driving regions.

14. The stator module of claim 4 wherein each electrical conductor of the respective subset of the plurality of electrical conductors of each electromagnetic driving region of the single row of electromagnetic driving regions extends substantially across the electromagnetic driving region.

15. The stator module of claim 4 wherein edges, that are transverse relative to the relative to the working surface, of the electromagnetic driving regions are generally coincidental to edges, that are transverse relative to the relative to the working surface, of one or more adjacent electromagnetic driving regions.

16. The stator module of claim 4 wherein:

the stator body has first and second outer side surfaces;

the single row of electromagnetic driving regions comprises first and second electromagnetic driving regions;

the first and second electromagnetic driving regions have respective edges that coincide with a projection of the first outer side surface on a plane; and the first and second electromagnetic driving regions have respective edges that coincide with a projection of the second outer side surface on the plane.

17. The stator module of claim 16 wherein projections of the first and second outer side surfaces on the plane are generally parallel.

18. The stator module of claim 4 wherein each electromagnetic driving region of the plurality of electromagnetic driving regions abuts an adjacent at least one of the plurality of electromagnetic driving regions.

19. The stator module of claim 1 wherein the stator module and the working surface are substantially rectangular.

20. The stator module of claim 1 wherein:

the working surface is in a plane;

the working surface is at least partially curved in the plane;

the width is a width between at-least-partially-curved sides of the working surface; and the length comprises at least one curve length.

21. A stator module comprising:

a stator body;

a working surface supported relative to the stator body; and a plurality of electrical conductors, each electrical conductor of the plurality of electrical conductors extending along a respective portion of the working surface and operable to generate a magnetic field to facilitate moving, relative to the working surface, a magnetized mover in the magnetic field in response to electrical current through the electrical conductor;

at least some electrical conductors of the plurality of electrical conductors in a first layer of electrical conductors of the plurality of electrical conductors extending in a first electrical conductor direction;

at least some electrical conductors of the plurality of electrical conductors in the first layer of electrical conductors of the plurality of electrical conductors extending in a second electrical conductor direction nonparallel to the first electrical conductor direction; and at least some electrical conductors of the plurality of electrical conductors in a second layer of electrical conductors of the plurality of electrical conductors separate from the first layer of electrical conductors extending in a third electrical conductor direction nonparallel to the first electrical conductor direction and nonparallel to the second electrical conductor direction.

* * * * *